United States Patent
Newman et al.

(10) Patent No.: US 9,756,931 B2
(45) Date of Patent: Sep. 12, 2017

(54) METHOD FOR PRODUCING A TOOTHBRUSH HAVING AN INNER CAVITY

(71) Applicant: The Procter & Gamble Company, Cincinnati, OH (US)

(72) Inventors: Matthew Lloyd Newman, Mason, OH (US); Li Wen, Mason, OH (US); Stephen Alan Houghton, Victoria (AU); Scott Jackson, Cincinnati, OH (US); Bradley John Phillips, Victoria (AU); Richard Darren Satterfield, West Chester, OH (US); Andrew M. Uhe, Victoria (AU); Christopher Thomas Ryan, Victoria (AU)

(73) Assignee: THE PROCTER & GAMBLE COMPANY, Cincinnati, OH (US)

( * ) Notice: Subject to any disclaimer, the term of this patent is extended or adjusted under 35 U.S.C. 154(b) by 640 days.

(21) Appl. No.: 13/683,744

(22) Filed: Nov. 21, 2012

(65) Prior Publication Data

US 2014/0137354 A1 May 22, 2014
US 2016/0302561 A9 Oct. 20, 2016

Related U.S. Application Data

(60) Provisional application No. 61/562,675, filed on Nov. 22, 2011.

(51) Int. Cl.
| A46B 9/04 | (2006.01) |
| A46D 3/00 | (2006.01) |
| B29L 31/42 | (2006.01) |
| B29C 49/00 | (2006.01) |
| B29C 49/04 | (2006.01) |
| B29C 49/20 | (2006.01) |
| B29C 49/24 | (2006.01) |

(52) U.S. Cl.
CPC ............... *A46B 9/04* (2013.01); *A46D 3/005* (2013.01); *A46B 2200/1066* (2013.01); *B29C 49/0031* (2013.01); *B29C 49/04* (2013.01); *B29C 49/20* (2013.01); *B29C 2049/047* (2013.01); *B29C 2049/2412* (2013.01); *B29L 2031/425* (2013.01)

(58) Field of Classification Search
CPC ..... B29C 49/00; B29C 49/6409; B29C 49/06; B29C 47/00544; A46B 9/04; A46D 3/005
USPC ....... 15/143.1, 167.1; 300/21; 264/523, 540, 264/541
See application file for complete search history.

(56) References Cited

U.S. PATENT DOCUMENTS

| 265,181 A | 9/1882 | Sylvester |
| 3,936,261 A | 2/1976 | Jones et al. |
| 4,802,255 A | 2/1989 | Breuer et al. |

(Continued)

FOREIGN PATENT DOCUMENTS

| CN | 2756064 | 2/2006 |
| CN | 102166064 | 8/2011 |

(Continued)

OTHER PUBLICATIONS

U.S. Appl. No. 13/683,445, filed Nov. 21, 2012, Matthew Lloyd Newman et al.

(Continued)

*Primary Examiner* — Shay Karls
(74) *Attorney, Agent, or Firm* — James E. Oehlenschlager

(57) ABSTRACT

Methods for producing toothbrush handles having an inner cavity are provided.

20 Claims, 22 Drawing Sheets

(56) References Cited

U.S. PATENT DOCUMENTS

| | | | |
|---|---|---|---|
| 5,052,071 A | 10/1991 | Halm | |
| 5,268,005 A | 12/1993 | Suhonen | |
| 5,313,909 A | 5/1994 | Tseng et al. | |
| 5,564,152 A | 10/1996 | Jeannet et al. | |
| 5,722,106 A | 3/1998 | Masterman et al. | |
| 5,836,769 A | 11/1998 | Spencer | |
| 5,845,358 A | 12/1998 | Woloch | |
| 5,884,127 A | 3/1999 | Kim et al. | |
| 6,018,840 A | 2/2000 | Guay et al. | |
| 6,058,541 A | 5/2000 | Masterman et al. | |
| 6,066,282 A | 5/2000 | Kramer | |
| 6,151,745 A | 11/2000 | Roberts et al. | |
| 6,475,553 B2 | 11/2002 | Guay et al. | |
| 6,553,604 B1 | 4/2003 | Braun et al. | |
| 6,679,696 B1 | 1/2004 | McConnell et al. | |
| 6,796,785 B2 | 9/2004 | Kawamoto et al. | |
| 6,818,174 B2 * | 11/2004 | Morawski | 264/572 |
| 7,389,781 B2 | 6/2008 | Kemp et al. | |
| 8,297,710 B2 | 10/2012 | Sakurai et al. | |
| 8,382,208 B2 | 2/2013 | Baertschi | |
| 8,568,634 B2 | 10/2013 | Porter et al. | |
| 2002/0074698 A1 | 6/2002 | Morawski | |
| 2003/0183242 A1 | 10/2003 | Kemp et al. | |
| 2004/0154112 A1 | 8/2004 | Braun et al. | |
| 2004/0221410 A1 * | 11/2004 | Padula | 15/210.1 |
| 2005/0036821 A1 * | 2/2005 | Pfenniger et al. | 401/123 |
| 2005/0170113 A1 | 8/2005 | Hill | |
| 2005/0170114 A1 | 8/2005 | Hill | |
| 2005/0188487 A1 | 9/2005 | Moskovich et al. | |
| 2006/0080794 A1 | 4/2006 | Punshon | |
| 2006/0151539 A1 | 7/2006 | Tsubaki et al. | |
| 2006/0272112 A9 | 12/2006 | Braun et al. | |
| 2007/0163064 A1 | 7/2007 | Wong et al. | |
| 2007/0251040 A1 | 11/2007 | Braun et al. | |
| 2007/0272652 A1 | 11/2007 | Beale | |
| 2011/0041272 A1 * | 2/2011 | Prencipe et al. | 15/167.1 |
| 2014/0047656 A1 | 2/2014 | Newman et al. | |
| 2014/0137349 A1 | 5/2014 | Newman et al. | |
| 2014/0137350 A1 | 5/2014 | Wen et al. | |
| 2014/0137353 A1 | 5/2014 | Wen et al. | |
| 2014/0138880 A1 | 5/2014 | Pfeifer et al. | |

FOREIGN PATENT DOCUMENTS

| | | |
|---|---|---|
| CN | 2160251 | 10/2015 |
| DE | 4136537 | 1/1993 |
| DE | 19531368 | 2/1997 |
| DE | 10023725 | 11/2001 |
| DE | 102005036301 | 2/2007 |
| EP | 0668140 | 8/1995 |
| EP | 0721832 | 4/1999 |
| EP | 1639913 | 3/2006 |
| JP | H1016037 | 1/1998 |
| WO | WO2004077996 | 9/2004 |

OTHER PUBLICATIONS

U.S. Appl. No. 13/683,495, filed Nov. 21, 2012, Cathy Wen et al.
U.S. Appl. No. 13/683,655, filed Nov. 21, 2012, Matthew Lloyd Newman et al.
U.S. Appl. No. 13/683,716, filed Nov. 21, 2012, Cathy Wen et al.
U.S. Appl. No. 13/683,801, filed Nov. 21, 2012, Ulrich Pfeifer et al.
International Search Report, mail date Aug. 1, 2013, 10 pages.

* cited by examiner

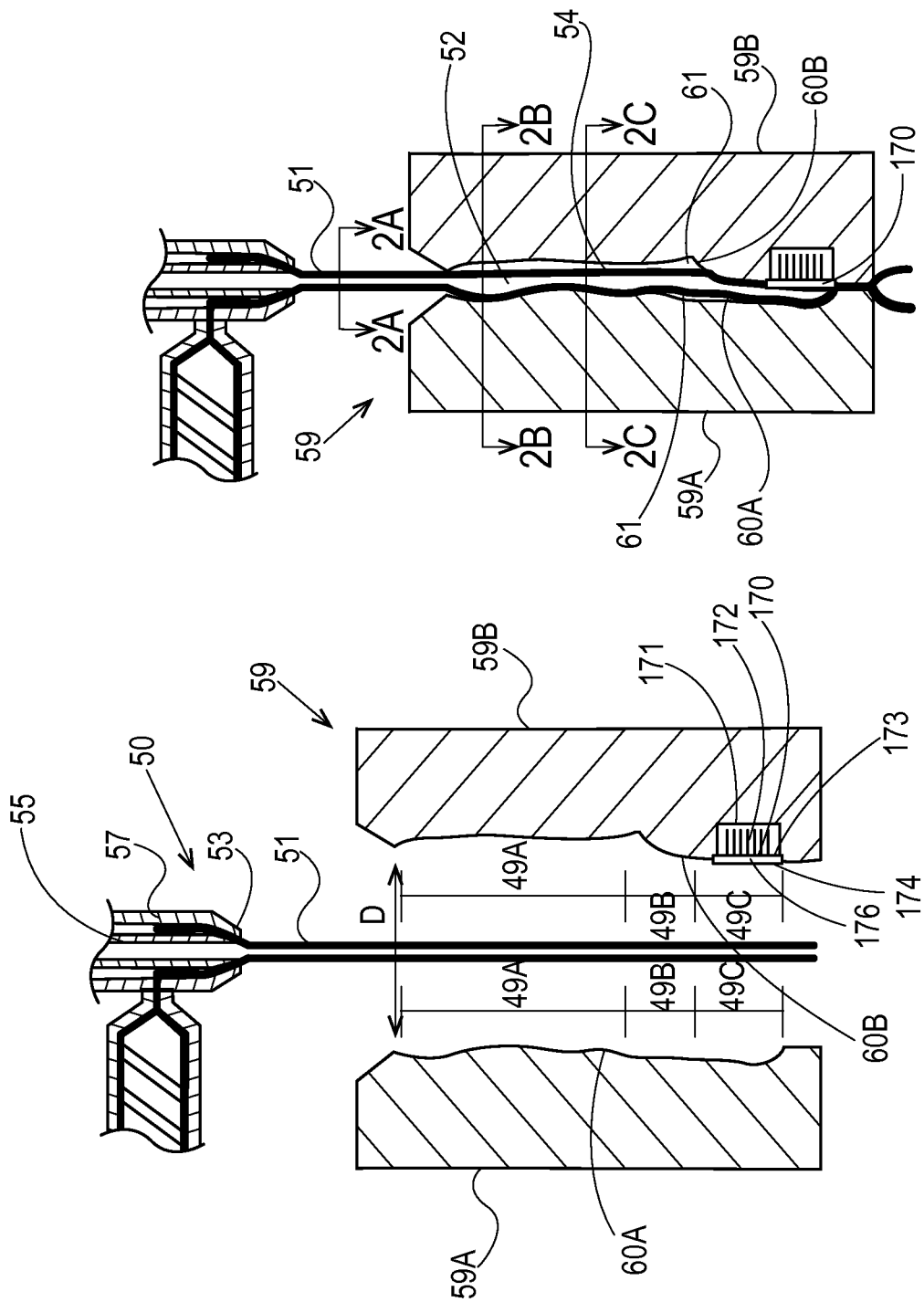

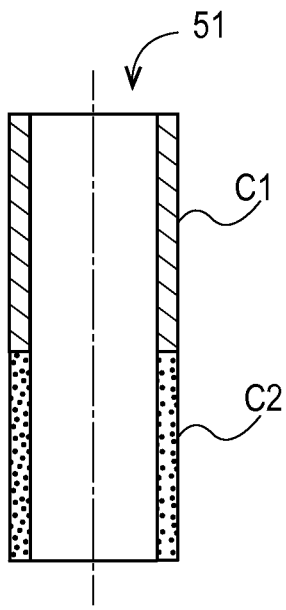# 
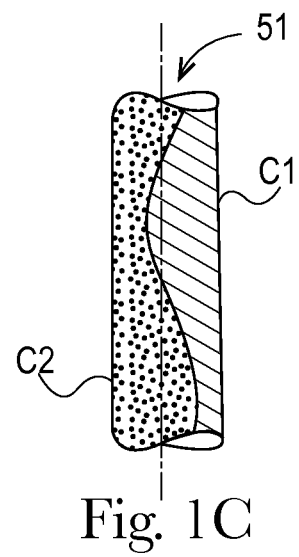
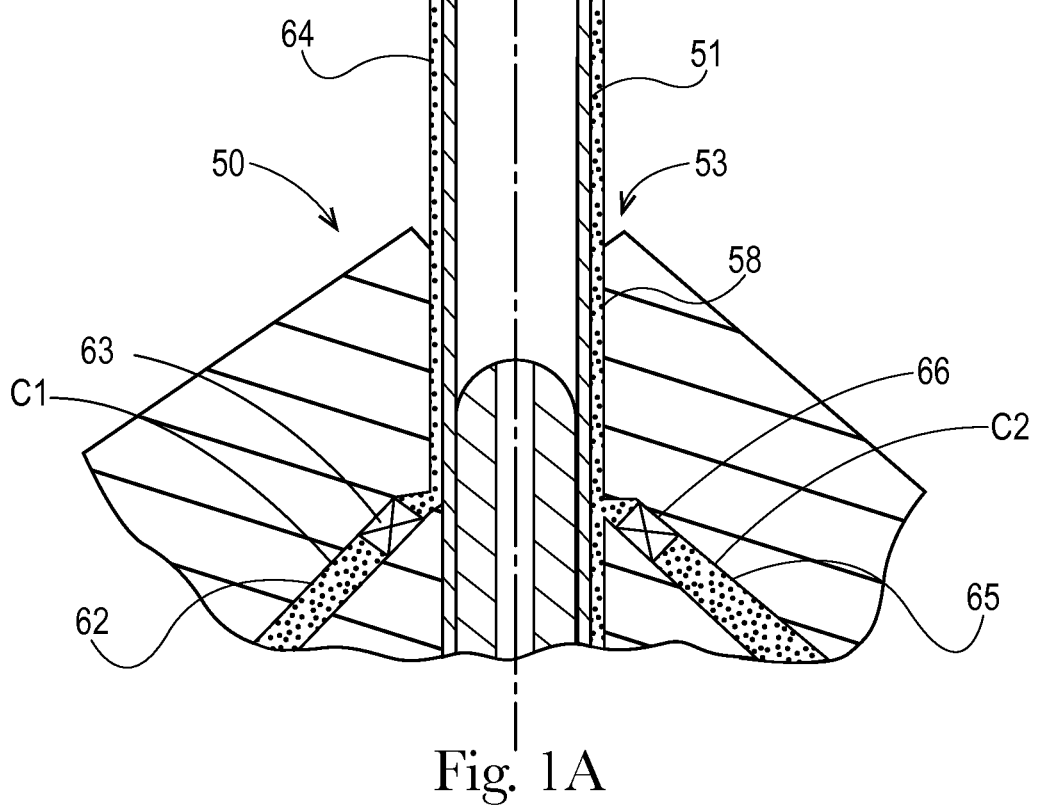

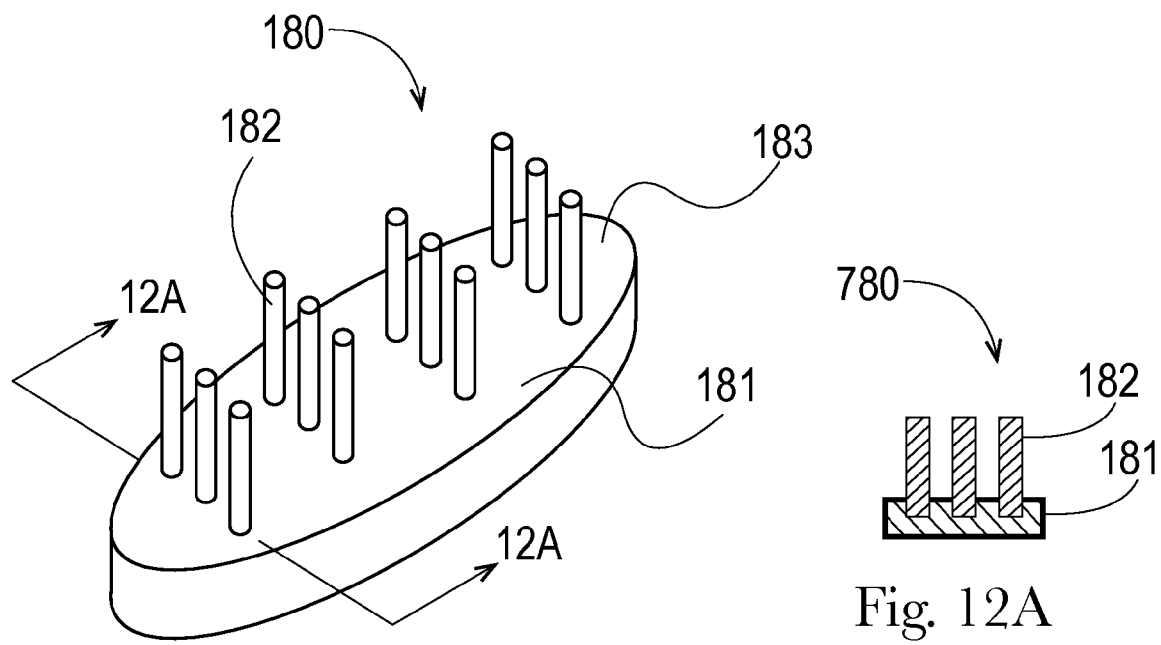
Fig. 12
Fig. 12A
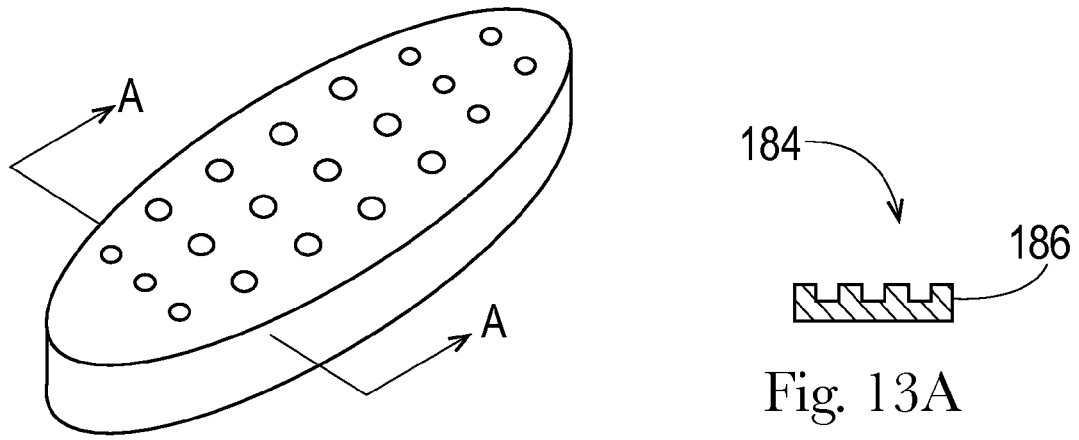
Fig. 13
Fig. 13A

METHOD FOR PRODUCING A TOOTHBRUSH HAVING AN INNER CAVITY

FIELD OF THE INVENTION

The present invention relates to methods of producing personal care articles such as toothbrushes having an inner cavity and an integrated subassembly, and a toothbrush produced by such methods.

BACKGROUND OF THE INVENTION

Toothbrushes are typically manufactured using an injection molding process. Such an injection molding process is characterized by providing a mold in the shape of the toothbrush and injecting molten plastic through a hot channel nozzle into the mold. Blind holes are molded into the toothbrush head to accommodate tufts of bristles at a later step. The toothbrush is then cooled and ejected from the mold and tufts of bristles are stapled into the pre-molded blind holes. For example, U.S. Pat. No. 5,845,358 shows such a toothbrush made by injection molding. This injection molding process may comprise a single injection molding step for a toothbrush made from a single component, or it may also comprise two or more injection molding steps for toothbrushes made from two or more components or materials. The second or subsequent materials may be of a significantly softer durometer than the first material to increase grip or provide distinctive design elements. Such an injection molding process is characterized by providing a mold in the shape of a portion of the toothbrush and injecting a first molten plastic through a hot channel nozzle into the mold, waiting some time for the part to sufficiently cool, then transferring the solid or semi-solidified part to a second molding cavity where a second material is injected into the void formed by the combination of the second mold and some surfaces of the first molded part. The toothbrush is then cooled and ejected from the mold. In the case of multi-component toothbrushes, the blind holes to accommodate tufts of bristles are typically molded in the first shot, however stapling of tufts of bristles is typically done following the last injection molding step. For example, U.S. Pat. No. 6,276,019 shows such a toothbrush made by injection molding.

Tufting toothbrushes by stapling tufts into molded or drilled blind holes has numerous disadvantages, which include but are not limited to: an additional step involving complex machinery, inclusion of metal elements to an otherwise wholly-plastic implement, and use of reciprocating stapling methods which tuft one hole at a time, thus limiting rate of toothbrush manufacture to slower than what is possible in multi-cavity injection molding.

In response to these limitations of stapling, a method has been developed to tuft toothbrushes during the injection molding process using a technique known as Anchor Free Tufting (AFT) or hot tufting. In AFT, tufts of pre-trimmed, end-rounded, polished or otherwise pre-processed filaments or bristles are first guided and permanently mounted into a carrier plate. The tufted carrier plate is then secured to the body of the toothbrush during injection molding of the hard component of the handle in what is commonly known as an In-Mold Assembly (IMA) process. Anchor Free Tufting solves many disadvantages of stapling, such as: rate of tufting, elimination of metal staples from the final part, and increased variation in bristle types and colors.

It is also known to those familiar in the art to directly overmold pre-fused tufts of bristles during an injection molding process. In this process, resin is injected into a mold cavity to surround a fused end of a tuft of bristles, creating a mechanical bond even in the absence of a chemical bond between dissimilar plastics, such as polyamides for bristles and polypropylenes for a toothbrush head. The heat of fusion creates a 'ball' of plastic at the fused end, which creates sufficient positive and negative undercuts in the plastic toothbrush head/handle during injection molding to retain the tufts even under moderate (25N) pull forces.

Whether tufts are introduced to injection molded toothbrushes via stapling, AFT, or any other form of hot tufting, injection molding of toothbrush handles in general has limitations. One of these limitations is that large diameter handles cannot be produced in an efficient manner, due to the cost of increased material and lengthened cooling times, resulting from the increased mass of material used Toothbrushes with increased handle diameters provide substantial advantages, for instance they can provide increased gripping area for children increasing the ability of children to handle and use toothbrushes; also people with disabilities such as arthritis sometimes have difficulty in handling toothbrushes due to difficulty in flexing the joints in their hands. Such difficulties are considerably relieved by means of toothbrushes having increased handle diameters. Additionally, the larger cross section handles on the toothbrushes are better for the user from an ergonomic point of view.

Toothbrushes with high-friction and/or low-durometer regions of a second material on the outer surface also provide substantial advantages in gripping. Low-durometer materials, such as those materials whose hardness is measured at less than approximately 90 on the Shore A scale, provide advantages in grip by deforming under the range of comfortable gripping forces. The deformation assists in holding the brush uniformly in position in the hand, and also provides a pleasing tactile feedback. Addition of high-friction grip surfaces directly reduces the squeezing force necessary to maintain a stable orientation of the brush bristles during use. Due to their low strength, however, toothbrushes made entirely from high-friction, low-durometer material are unlikely to exhibit the bend strength necessary to provide adequate force to brush in a conventional grip style. Thermoplastic Elastomers (TPEs) in the hardness range of Shore A 20-90 are a common second, third or subsequent material used to improve grip on toothbrushes and other personal care articles.

Variations in cross sectional area, including both larger and smaller cross sectional areas, along the length or major axis of the brush assist the user in the grip and handling of the brush during use, when it must be rapidly moved often while wet or slippery. Additionally, materials that maintain a higher coefficient of friction when wet, including TPEs in the above-mentioned hardness range can assist in wet-grip situations.

Even though there are advantages to toothbrushes having increased handle diameters the use of injection molding to manufacture toothbrushes with larger cross section handles has at least seven disadvantages:

First—the toothbrush is more expensive due to the use of more plastic to make the toothbrush. The material used to create the toothbrush handle increases approximately with the square of the diameter of the handle.

Second—the cost of manufacture is increased because the time needed to cool and solidify the toothbrush increases considerably. The increased cooling time is due both to the increased quantity of hot plastic, and the larger cross section of the toothbrush. As plastic has a relatively low thermal conductivity, extracting heat from the center of the brush is substantially more difficult with an increased cross section. It is known to those familiar in the art that overall cooling time for all molding cycles for a multi-component brush can be minimized by balancing the size of each shot of plastic so that the brush is substantially uniformly divided by weight for each component, however this has the drawback of requiring a greater fraction of use of an expensive material, typically TPE, than would otherwise be required. In essence, both material use and capital equipment time cannot both be simultaneously optimized for this type of injection molded toothbrush.

Third—most thermoplastics shrink during cooling and solidification. Shrinkage can be mitigated by packing additional molten plastic into the center of the handle through the injection gate as the outer edges of the handle cool, however this mitigation loses effectiveness as the injection gate is placed away from the thickest portion of the handle and placement of the gate, which will have some tactile vestige, in the thick, gripping portion of the handle can lead to dissatisfaction during use. For many toothbrush handle designs, packing alone cannot mitigate the visible surface shrinkage and surface defects and internal defects associated with an increased handle cross section. These surface defects can be manifested as unintentional variations in surface gloss or texture, which contribute negatively to the look and feel of the part. Internal defects can be manifested as voids or bubbles inside the plastic, which can weaken the handle visibly or invisibly, depending on the degree of transparency of the plastic. It is known to those familiar in the art that a second component can be used to cover or hide negative cosmetic features such as gate vestiges or sink marks, however this cannot by nature work on the final shot which must necessarily have an uncovered gate vestige and may also contain sink marks in thick sections.

Fourth—the injection molding process requires sufficient energy addition to fully melt the plastic to a liquid state, so that it can travel under pressure through the runner, nozzle, and gate to completely fill the injection mold cavity.

Fifth—the filling and packing of the plastic into the injection mold cavity requires very high pressures, typically thousands of pounds per square inch, which necessitates mold cavities made from very high-strength materials, which are expensive and time-consuming to create. These extremely high pressures can in fact limit the speed of the manufacturing process by requiring complete or near-complete cooling and/or solidification of one plastic shot prior to injection of the subsequent shot.

Sixth—the injection of multiple shots of plastic in multiple steps necessarily requires each component of material to have at least one unique mold cavity portion which significantly adds to expense, complexity and difficulty in molding, especially where plastic and metal meet to form an edge, also known as a shutoff.

Seventh—in multi-cavity production, the balance of fill between shots is especially difficult to control with TPEs, as they have a narrow range of processing temperatures and their viscosities do not vary substantially over this range.

In an attempt to overcome the difficulties associated with the use of injection molding to produce toothbrush handles having increased diameters, it has been suggested to produce toothbrush handles having a hollow body. For example, EP 0 668 140 or EP 0 721 832 disclose the use of air assist or gas assist technology to make toothbrushes having hollow, large cross-sectional handles. In the disclosed process, molten plastic is injected near the base of the toothbrush handle, wherein subsequently a hot needle is inserted into the molten plastic to blow gas into the molten plastic which is then expanded towards the walls of the injection mold. In a similar manner, U.S. Pat. No. 6,818,174 B2 suggests injecting a predetermined amount of molten plastic into the cavity to only partially fill the mold cavity and subsequently inject a gas through a gas injection port formed in the injection mold to force the molten plastic into contact with the walls of the mold cavity. Such injection molding processes using additional air injection have substantial difficulty forming hollow handle bodies with substantially uniform wall thickness, and as such, the potential for optimization of a handle for maximum ergonomic function in minimum material weight and manufacturing efficiency is limited. A further drawback to such injection molding processes in U.S. Pat. No. 6,818,174 B2 is the creation of a vent hole for the gas. EP 0 668 140 provides a possible solution to this problem via use of a moving injection pin to create a sealed part, however the integrity of this seal under the injection molding pressures created in the second shot is highly sensitive to processing conditions and is therefore not known. The vent hole is formed at the interface of molten plastic and high-pressure gas (and not by mold steel) and thus cannot be made predictably or with high precision. A still further drawback of hollow-handled toothbrushes made using gas-assist injection molding relates to the application or installation of a second, third or subsequent material to the toothbrush by injection molding, or overmolding, where the overmolded material may, in the process of sealing the necessary gas vent, intrude substantially into the hollow void created in the first gas injection step, as there is nothing to stop it besides friction and the near-atmospheric pressure inside the void. EP 0 721 832 illustrates this effect in detail. While this may still result in a cosmetically-acceptable part, it prevents use of shot-size-limiting devices such as valve gates and can add substantially to the cost of the part.

Gas-assist injection molding does not substantially reduce injection pressure or melt energy required to form a plastic article. And as with all other known injection molding processes, multiple cavities and injection steps are required to add each material to the molded article.

A conventional method to create toothbrush handles having increased cross sections, such as electromechanical toothbrush handles, is to manufacture discrete parts of the handle separately using injection molding, then to assemble these parts in either a separate step, or in a subsequent injection molding step, or most often some combination of the two, whereby the discrete parts from the first step or steps are inserted into an injection mold first and one or more additional materials are injected around them, creating a hollow body from multiple parts. This manufacturing method still has the drawbacks of requiring the complete melting of plastic, high pressures, and associated equipment involved with the final injection molding step. The use of injection molding to create multiple discrete parts, which are assembled at a later step, has also the disadvantage that each part must not contain any substantial undercut from which the mold core forming a concave surface of the injection-molded part could not be extracted from the part after molding; or in the case where such undercut exists, it must be created carefully by means such as collapsing mold cores and is thus subject to extensive constraints on the surrounding geometry. Further, mold cores must typically contain some mechanism to cool or remove heat, and would thus be difficult or impossible to create to make internal geometry for most manual toothbrushes which may have diameters of 10 mm and lengths beyond 150 mm. The lack of undercuts in discrete parts combined with the length and diameter of cores required to make non-undercut handle parts combined with the desire for multiple areas of variation in cross sectional area on a toothbrush handle would thus require any discretely-assembled handles to have multiple mating surfaces which would preferably require seals to maintain barriers to moisture and debris, even under time and repeated use. To eliminate the need for gaskets and expensive, pliant materials, these seals are typically made using permanent-fastening operations such as ultrasonic welding or gluing.

Installation of soft-touch or second materials to hollow molded articles can be made by other means such as welding, gluing or use of flexibility of the soft-touch material to itself grip an undercut pre-molded into the main article. These methods all have disadvantages however in long-term adhesion, especially to thermoplastics with less-active surfaces made from materials such as polypropylenes. Durable articles made from multiple components which must be used in unpredictable circumstances and environments such as consumers' bathrooms must necessarily be constructed more robustly than for example, disposable articles or packages.

Electromechanical toothbrushes in particular are susceptible to problems of assembly, as they are necessarily hollow in order to include batteries, motors and associated electrical linkages and drive components which must be all placed inside with some degree of precision. To avoid the problems and expense of welding plastic parts together and multiple assembly steps of a sealed outer shell, it has been proposed to blow mold the handle for electromechanical toothbrushes. In the assembly of a blow molded electromechanical toothbrush it is necessary to leave the blow molded portion of the handle open in at least one end to accommodate the motor, batteries, and drive system components. In this process, the minimum diameter of at least one opening to the blow molded handle must exceed the smallest linear dimension of every component that will be inserted. Such a large opening would be a drawback in a non-electromechanical handle, which has no need to accommodate internal component entry, and would necessitate an overly-large second part or cap to prevent intrusion and collection of water, paste, saliva and other detritus of conventional use. Such an overly-large opening, if positioned near the head, would interfere substantially with ergonomic use of the brush. Additional constraints to the geometry on the inside surface of the cavity, for example to locate motors, housings, batteries, etc. which must be positioned inside accurately as to be rigidly fixed will also be detrimental to the overall blow molding process, as the majority of the inner cavity surface of a blow molded part cannot be defined directly by steel in the mold surfaces, and is instead defined indirectly by steel on the outer surface of the handle combined with the wall thickness of the parison, blowing pressure and stretch ratio of the final part to the original parison or preform thickness. Such constraints of these process variables will necessarily limit manufacturing efficiencies.

To accommodate activation of electrical components via a standard button or mechanical switch, at least some portion of a blow molded electromechanical toothbrush handle should be made thin enough to flex substantially under pressure of a finger or hand squeeze. Such a thin-walled structure or film-walled structure necessarily requires some strengthening mechanism to ensure durability and rigidity under use. An internal frame or cap, as described in WO 2004/077996 can be used to provide this necessary strengthening mechanism in an electromechanical toothbrush, but would be a drawback to a manual brush, which must contain no additional components to function adequately, in extra expense, complexity and additional load-bearing parts. Further, due to the linear nature of the motor, power source, and drive shaft of electromechanical toothbrushes there are no or minimal variations to the cross-sectional area of the inner cavity; such that the inner cavity walls provide mechanical support to the internal components to reduce or eliminate unwanted movement or shifting. Alternately, it would be required to cut or drill a hole in the blow molded part and then to fasten somehow a flexible cover to transmit the mechanical motion from the outside of the brush to the switch inside.

An electromechanical toothbrush handle, made by blow molding or injection molding, is typically manufactured with an opening at both ends: At a distal end there is typically an opening to accommodate the mechanical translation of power through a drive mechanism to the toothbrush head, and at a proximal end there is typically an opening to accommodate insertion of components during manufacturing and possibly also insertion or removal of the battery by the user. Such a second opening would be unnecessary for a manual toothbrush and would create drawbacks in the need for additional seals and mechanical fasteners. In some blow molding processes, the formation of openings at the distal and proximal ends of the molded part are intrinsic to the process and would benefit the formation of a double-open-end handle, but would not be necessary for a manual toothbrush handle.

Blow molding technology is a high volume manufacturing process. One of the key challenges for most high volume production is managing variety in the form of shape, color, functional elements such as bristles and tufts, and decorations. This typically involves batch manufacturing, including switching over certain processes and equipment resulting in equipment downtime. Additionally high volumes of one product design need to be stored or buffered in batches in those cases where different designs want to be combined to be included into one single package. Manual tooth brushes for example are often sold in multipacks that include different colors of the same product form. Changeovers in injection molding processes can be minimized by injecting different colors simultaneously to different cavities in the mold, but this increases complexity of machinery.

It is familiar to those in the art to use extrusion blow molding to create single-component or single-material lightweight hand-held articles, such as children's toys, plastic bats, plastic golf clubs or any large, plastic article which benefits from being lighter in weight. While these articles can be both stiff and strong in bending, they also generally contain drawbacks which would limit their general use in semi-durable, Class-I medical devices, such as toothbrushes. First, such articles typically contain significant flash along parting lines, or in any locations where the parison is larger in cross sectional area than is the cavity to which it is blown. In these locations the parison folds within the cavity and substantial flash is created, even in the absence of cavity parting line. Second, most articles contain some significant vestige of blowing in the form of a hole, which may be accurately or inaccurately formed. Such a vestige would be regarded as a significant defect in a Class-I medical device which must prohibit breach or entry of contaminants to a hollow interior which does not drain effectively. Third, the relative size of these articles is large in comparison to the size of these defects, and the overall function of the articles is not severely affected by these defects. In many cases, the size of the article itself renders the manufacturing process easier, with respect to the minimization of defects. It is not challenging to extrusion blow mold articles, packages or bottles in the size range common to manual toothbrush handles—if the plastic wall thickness can be minimized in proportion to the overall cross section. Such articles exist in the form of small, typically squeezable, tubes or bottles which in fact benefit from having a very thin, deformable wall which enables dispensing of internal contents, making them unusable or significantly inferior as toothbrushes.

Extrusion and injection-blow-molded handles for single-component semi-durable consumer goods such as feather dusters and tape dispensers are also known, but again these articles would not meet criteria for semi-durable Class I medical devices, specifically with regard to the sealing of the necessary blowing orifice against intrusion of water or other contamination, and in the case of extrusion blow molding, in the appearance of flash on the articles in areas that would directly contact or go into the mouth. These articles can also be brittle, and when too much force is applied, can break or snap suddenly and without ductility, producing sharp edges, making them unusable for use in the oral cavity.

Multi-material blow molded packages, such as water bottles, are known to those familiar in the art. In these embodiments, smooth blow molded bottles are provided with tactile, high-friction surfaces via the use of an in-mold labeling technique, which is a subset of in-mold assembly, whereby previously injection-molded, textured labels are placed into mold cavities prior to introduction and blowing of the semi-molten parison of extruded plastic. While these articles do provide the advantage of a large gripping surface which is improved by addition of a high-friction textured surface, they are by nature highly-deformable or squeezable packages designed for liquid storage and dispensing and would serve poorly as toothbrushes as there is no obvious method to attach bristle tufts without injection molding.

It has also been proposed to manufacture hollow toothbrushes, and in fact it should not prove challenging to injection blow mold or even injection-stretch blow mold such an article in the general shape and size of a toothbrush or toothbrush handle, as stated previously, however no existing disclosure in the prior art addresses the issues of: Strength in bending, stiffness in bending, overall rigidity, mitigation of flash or other sharp defects, variations in cross-sectional area, and obstruction or sealing of the blow hole vestige. Any one of these defects in a blow molded toothbrush or toothbrush handle would severely affect the utility of the article, and as such, improvements are needed to enable a hollow article with material savings maximized by uniform wall thickness which is suitably strong and stiff in bending without breaking in use and does not leak or present uncomfortable defects to the user.

In view of these disadvantages reflected in the prior art, it is an objective of the present invention to provide an improved method for producing a tufted toothbrush, which avoids the drawbacks of the prior art.

SUMMARY OF THE INVENTION

A method for extrusion blow molding a toothbrush is provided that comprises providing an extrusion blow mold having a longitudinal axis and a cavity, the cavity having a handle portion, a neck portion, a head portion, and a surface that defines a cross-sectional area; wherein the cavity has at least one of a maximum cross-sectional area, bordered by two smaller cross-sectional areas along the longitudinal axis of the blow mold or a minimum cross sectional area bordered by two greater cross-sectional areas along the longitudinal axis of the blow mold; providing a subassembly positioned in the head portion of the cavity; extruding a parison comprising a thermoplastic material, the parison includes an interior cavity and an outer surface, wherein the outer surface defines a cross-sectional area of the parison; expanding the parison using a fluid to contact the cavity surface and subassembly to produce a toothbrush handle having an inner cavity.

A method for extrusion blow molding a toothbrush is provided that comprises providing an extrusion blow mold having a longitudinal axis and a cavity, the cavity having a handle portion, a neck portion, a head portion, and a surface that defines a cross-sectional area; wherein the cavity has at least one of a maximum cross-sectional area, bordered by two smaller cross-sectional areas along the longitudinal axis of the blow mold or a minimum cross sectional area bordered by two greater cross-sectional areas along the longitudinal axis of the blow mold; providing a subassembly positioned in the head portion of the cavity; extruding a parison comprising a first thermoplastic material and a second thermoplastic material, the parison includes an interior cavity and an outer surface, wherein the outer surface defines a cross-sectional area of the parison; expanding the parison using a fluid to contact the cavity surface and subassembly to produce a toothbrush handle having an inner cavity.

BRIEF DESCRIPTION OF THE DRAWINGS

FIG. 1 is a sectional view of an extrusion step in an extrusion blow molding process according to an embodiment of the present invention.

FIG. 1A is a sectional view of an extrusion step in an extrusion blow molding process according to an embodiment of the present invention.

FIG. 1B is a perspective view of an extruded parison produced during an extrusion blow molding process according to an embodiment of the present invention.

FIG. 1C is a sectional view of an extruded parison produced during an extrusion blow molding process according to an embodiment of the present invention.

FIG. 2 is a sectional view of an extrusion blow mold process for producing a toothbrush according to an embodiment of the invention.

FIGS. 12-12A are an illustration of a tufted subassembly according to an embodiment of the invention.

FIGS. 13-13A are an illustration of a subassembly without tufts according to an embodiment of the invention.

<stopped here>

Figure 19:
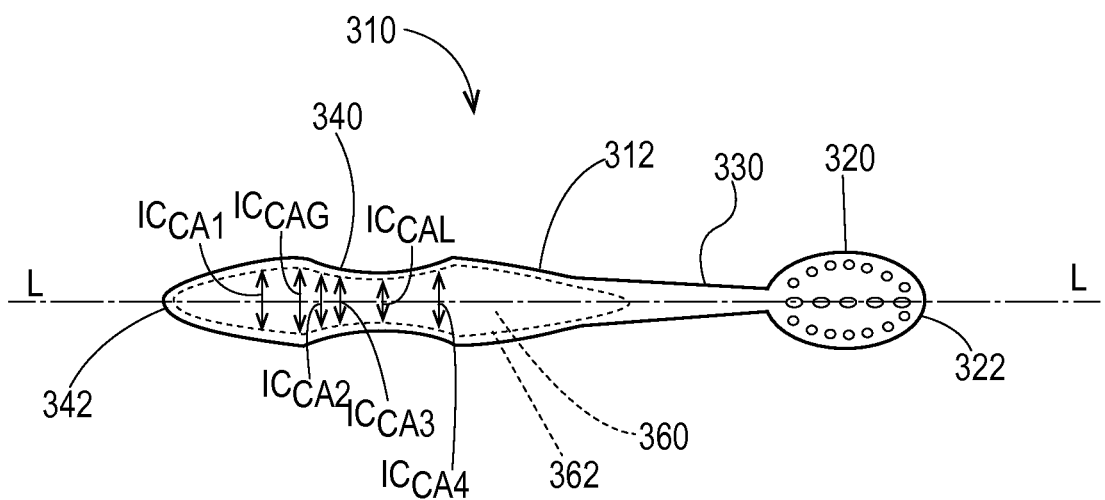

FIG. 19 is a perspective view of a toothbrush according to an embodiment of the present invention.

Figures 19A, 19B:
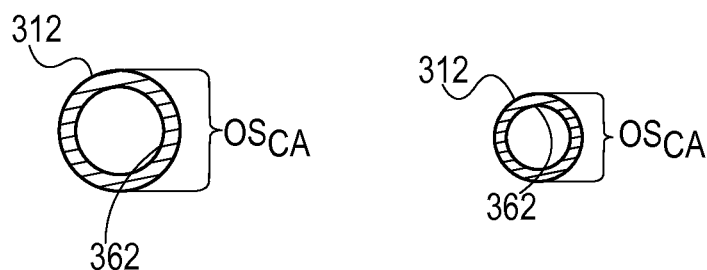

FIG. 19A is a cross-sectional view of FIG. 19 along section line 19A according to an embodiment of the present invention.

FIG. 19B is a cross-sectional view of FIG. 19 along section line 19B according to an embodiment of the present invention.

Figure 20:
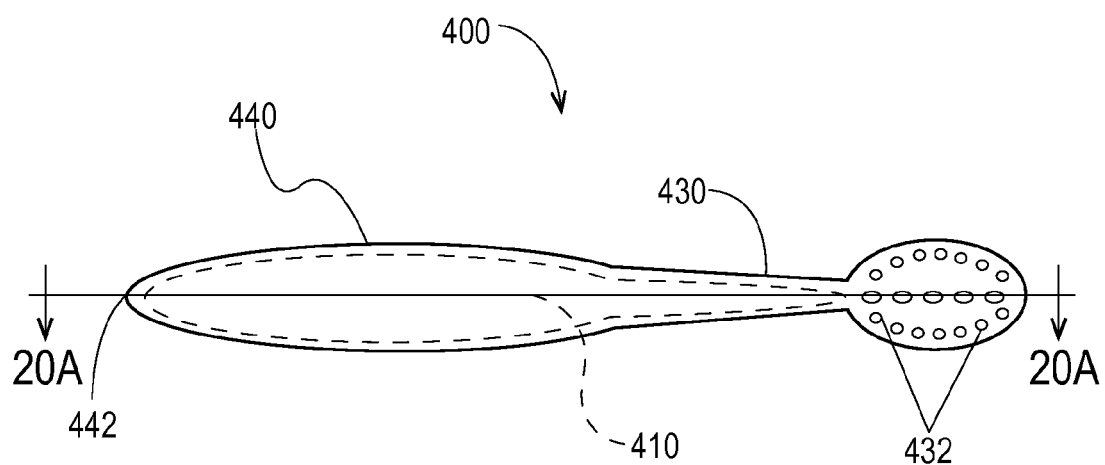

FIG. 20 is a perspective view of a toothbrush according to an embodiment of the present invention.

Figure 20A:
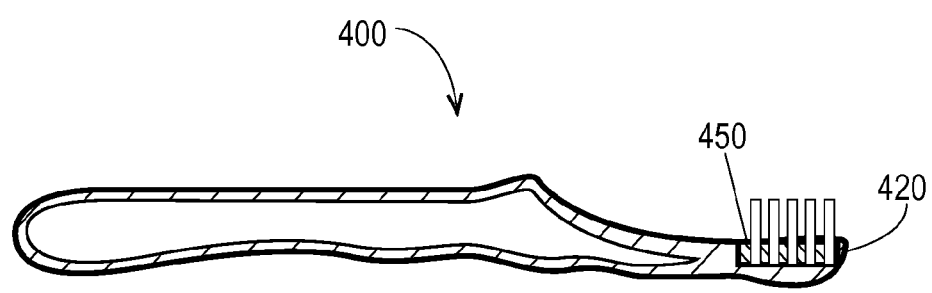

FIG. 20A is a cross-sectional view of FIG. 20 along section line 20A according to an embodiment of the present invention.

DETAILED DESCRIPTION OF THE INVENTION

The present invention relates to one or more methods for producing personal care articles, such as a toothbrush handle having an inner cavity, wherein the method includes a blow molding step, said blow molding step including contact and mechanical or chemical attachment or binding to at least one subassembly of tufts or bristles. The blow molding step can be used on (1) a semi-molten, extruded hollow tube of plastic (parison)—extrusion blow molding, or (2) on a previously injection-molded hollow body (preform)—injection blow molding, or (3) on a welded or assembled hollow tube of heated, semi-molten plastic, or (4) on one or more thin sheets of plastic which are blown into incomplete portions of a cavity, or cavity-halves, and assembled after blowing; and involves the positioning of a parison or preform into a cavity and expansion of the parison or preform to the cavity walls using pressurized fluid. The pressurized fluid can be pressurized positively with respect to atmosphere or pressurized negatively with respect to atmosphere, i.e. in the form of a partial vacuum. In certain embodiments, an injection blow molding process may comprise a second step, a stretch rod may be used to elongate the hollow injection molded preform during the blow molding step—injection stretch blow molding.

As shown in FIG. 1, in extrusion blow molding, a semi-molten thermoplastic material is extruded through an annulus 53 of an extruder 50, which also comprises an inner mandrel 55 and an outer die 57 to produce a tubular shaped parison 51. The semi-molten thermoplastic material may be extruded at a rate of from about 0.1 [2.54 mm/sec] in/sec to about 8 in/sec [203 mm/sec] or from about 1 in/sec [25.4 mm/sec] to about 5 in/sec [127 mm/sec] and may have a temperature of from about 100° C. to about 300° C. or from about 140° C. to about 250° C. In certain embodiments, as shown in FIG. 1A, which shows a detailed section of the extruder 50 with a core tubular shaped parison 51, to produce a parison 51 having more than one layer, the extruder 50 includes at least one other material injection mechanism 62, which as shown in FIG. 1A can be another extruder nozzle typically placed downstream from the first controlled by a valve 63 to inject a second thermoplastic material 64 providing one or more physical properties to a toothbrush handle, which may be the same or different from any previous or subsequent thermoplastic material. Examples of physical properties include texture, coefficient of friction, stiffness, softness, or as illustrated FIG. 1A, provided by addition of colorant C1 to the second thermoplastic material 64 or alternatively directly into the parison 51 to color it with colorant C1. In certain embodiments there may be a further material injection mechanism 65 controlled by a valve 66 injecting a third thermoplastic material 58, providing one or more physical properties to a toothbrush handle, which may be the same or different from any previous or subsequent thermoplastic material, as explained previously. In this instance, as with the second thermoplastic material the physical property is color provided by addition of colorant C2 to the third thermoplastic material 58, which is extruded on the outside surface of the parison 51 or alternatively the colorant C2 could be added directly into the parison 51 to color it with colorant C2, for example as shown in FIG. 1A there is a multilayer parison 51 where the colored thermoplastic material 64, 58 is injected to form a layer on the outer surface of the parison 51 in sequential patterns. Colorants C1 and C2 can be injected in a way to create different colors along the parison 51 as it leaves the extruder 50. The extruder can have more than 2 color mechanisms to create even more variety in colors. FIG. 1B shows an injection of colorant C1, C2 that is coloring the entire parison 51 in sequential patterns. FIG. 1C shows multiple colorants C1, C2 applied around the circumference of the parison 51.

The thermoplastic materials from which a toothbrush handle can be made is limited by (1) strength or resistance to bending and axial loading, (2) toughness, as the opposite of brittleness, (3) Class I medical device requirements, (4) chemical compatibility with a variety of toothpastes and active chemistries therein, (5) chemical compatibility with other components which are typically attached to toothbrush handles such as, decals, printed inks, labels, grip elements and the like, and (6) melt flow and melt strength compatible with extrusion blow molding or injection blow molding.

Thermoplastic materials meeting these criteria that can be used to make toothbrush handles include polypropylenes (PP); nylons (polyamides) (PA); polyethyleneterapthalates, including polyethyleneterpthalate glycols (PET & PET-G); low-density and high-density polyethylenes (LDPE & HDPE); polyesters (PE); polyvinylchlorides (PVC); and engineering plastics such as Acrylonitrile Butadiene Styrene (ABS), polyphenylene ether (PPE), polyphenylene oxide (PPO). Any sub-types of these materials or other thermoplastics, including blow-molding-grade thermoplastics, with melt flow indices between 0.3 and 3.0 g/10 min can be used if a blow molding process is used. Few materials outside of thermoplasts can satisfy all the requirements, however blow molded metal objects are known, and some alloys of zirconium can be formed into hollow shapes using blow molding techniques.

In certain embodiments two or more thermoplastic materials can be used to produce a toothbrush handle, for example a hard plastic material such as PP, PET, PET-G, LDPE, HDPE and one or more thermoplastic elastomers (TPE) chemically compatible with the first material. Examples of TPEs include Sytrenics (S-TPE), Copolyesters (COPE), Polyurethanes (TPU), Polyamides (PEBA), Polyolefin blends (TPO) and Polyolefin alloys (TPV). For example a Polyolefin-based TPE such as TPO would be used with a polyolefin based hard plastic such as Polypropylene, and both are introduced into the extrusion parison to form a toothbrush handle comprising portions made of different thermoplastic materials integrally connected to each other. For example, in toothbrush handles the surface portions that are contacted by the thumb or the finger tips can be made of soft plastic, whereas the remaining portions of the toothbrush handle can be made of hard plastic to give the toothbrush sufficient rigidity. The extruded parison made of different thermoplastic materials is then blow molded in the cavity to create the final shape, wherein portions of different material may be deformed.

In certain embodiments of the present invention, a toothbrush handle may be made from multiple layers of material to create different tactile surfaces in a single step in a single molding cavity. Generally, in a multi-layer embodiment, an inner, or substrate, layer is made from a first material which is the main load-bearing material and is typically thicker than subsequent outer layers; and an outer layer may be made from a softer material which may have a higher coefficient of friction with skin, or other improved tactile features.

Layers may be made in one of three ways: (1) They may be prepared upstream of an extruding orifice in the case of extrusion blow molding or extrusion welding, in which case the layers are melted and brought together and co-extruded integrally with one another, which is known as multi-layer extrusion blow molding, for example as shown in FIGS. 1A-1C, or (2) they may be injection molded together as is taught in EP 1 559 529 and EP 1559 530 then blown in a second step, or (3) they may be prepared separately through discrete extrusion processes and brought together only during the molding stage, where a parison of substrate material is extruded and a second material is extruded then cut into a patch or coupon, or is alternately injection molded by itself, and then placed into the mold cavity, which is known to those familiar in the art as in-mold labeling.

For toothbrushes which are made from multiple components at least one component may be from the list named immediately above, and a second material be composed either from the same list or from any thermoplastic elastomer (TPE) containing materials in the above list in some fraction, to allow for heat-activated adhesion and improved grip, deflection, and coefficient of friction with skin.

In multi-layer extrusion blow molding, multiple materials may be extruded in different manners, for example one manner in concentric layers, the second in a radially-varying manner and the third in an axially-varying manner whereby material or color varies along the extrusion axis. In all three manners, the extruded parison is created by introducing different materials at specific locations and injection pressures upstream of the extrusion annulus. Using this method, toothbrush handles with up to seven layers or multiple stripes can be produced. In the third manner wherein material or color varies along the extrusion axis, the injection port may selectively open and close during the formation of a parison that will form a toothbrush handle.

With reference to FIG. 1 the position of the die 55 and mandrel 57 may be adjustable to allow variation of the wall thickness of the parison 51. The semi-molten thermoplastic is extruded at a temperature sufficiently high to create a homogeneous amorphous structure in the continuous parison, but also at a temperature sufficiently low to allow the tube to carry some load across its longitudinal direction; as the parison 51 may either hang vertically from the extrusion annulus 53, or may be carried or pulled in a non-downward direction.

The parison 51 may be extruded at a speed sufficient that its temperature throughout the length of the final molded toothbrush handle does not fall below a glass transition temperature, or temperature necessary to substantially deform the parison by applied pressure; as the heat transfer from the parison 51 to air is low, and it may be expected that the parison 51 temperature can be stable for more than several seconds following extrusion from the annulus 53. The average cross-sectional area of the extruded parison 51 may be smaller than the average cross-sectional area of the resulting toothbrush handle, and may even be smaller than the cross-sectional diameter of 90% or more the toothbrush handle throughout its length.

Two or more cavity sections, in this instance as shown in FIGS. 1 and 2 are two cavity sections 59A, 59B of the extrusion blow mold 59 are constructed such that their cavity surfaces 60A, 60B when the cavity sections 59A, 59B are brought together form an extrusion blow mold cavity 61, which in certain embodiments may be an approximate negative of the desired toothbrush shape that will be created from an extruded parison. Each cavity section 59A, 59B comprises a handle portion 49A, neck portion 49B, and head portion 49C, which correspond to the respective handle, neck, and head portions of a molded toothbrush. In this embodiment cavity section 59A will form the rear part of a toothbrush (rear cavity section) and cavity section 59B will form the front part of a toothbrush (front cavity section). However, other embodiments are also envisioned including but limited to molds having more than one section and molds having right and left sections. As shown in FIG. 1 the mating cavity halves 59A, 59B are separated from one another by a distance (D) at least greater than the parison 51 cross-sectional area to allow the introduction of the parison 51, and placement of a pre-manufactured subassembly of tufts or bristles (subassembly) 170.

In certain embodiments, the subassembly 170 is positioned in the head portion 49C of the front cavity section 59B, as shown in FIG. 1. The subassembly may comprise an injection-molded component having one or more cleaning elements. The subassembly may, however, comprise any of a number components or features, some of which are described below. The subassembly may be made from any solid material, including thermoplastics, thermosetting rubbers, metals, woods, natural minerals or any combination thereof that can withstand compressive pressures from 2.8 to 11 bar.

The subassembly 180 as shown in FIG. 12, 12A may comprise a plate 181 having a shape and size conforming to a desired toothbrush head, with one or more cleaning elements 182 extending from a front surface 183. The subassembly may support a plurality of cleaning elements, such as bristles or tufts of bristles. The bristles or tufts of bristles may comprise nylon, PBT, and TPE. In addition to bristles or tufts of bristles a subassembly in the present invention may include any suitable cleaning element which can be inserted into the oral cavity. Some suitable cleaning elements include elastomeric massage elements, elastomeric cleaning elements, massage elements, tongue cleaners, soft tissue cleaners, hard surface cleaners, combinations thereof, and the like. The subassembly may comprise a variety of cleaning elements. For example, the subassembly may comprise bristles, abrasive elastomeric elements, elastomeric elements in a particular orientation or arrangement, for example pivoting fins, prophy cups, or the like. Some suitable examples of elastomeric cleaning elements and/or massaging elements are described in U.S. Patent Application Publication Nos. 2007/0251040; 2004/0154112; 2006/0272112; and in U.S. Pat. Nos. 6,553,604; 6,151,745. The cleaning elements may be tapered, notched, crimped, dimpled, or the like. Some suitable examples of these cleaning elements and/or massaging elements are described in U.S. Pat. Nos. 6,151,745; 6,058,541; 5,268,005; 5,313,909; 4,802,255; 6,018,840; 5,836,769; 5,722,106; 6,475,553; and U.S. Patent Application Publication No. 2006/0080794. Further the cleaning elements can be arranged in any suitable manner or pattern on the subassembly.

With reference back to FIG. 1, there may exist a recess 171 in the head portion 49C of the front cavity section cavity surface 60B to accommodate cleaning elements 172 of the subassembly 170, which in this embodiment extend from the front surface 173 of the subassembly 170, in this instance a plate 174, so that the plate 174 carries any load transferred by the contacting parison. The parison-contacting surface 176 of the subassembly 170 faces towards the inner cavity 61 of the mold 59 and away from the recess 171. A plate comprising the load-bearing portion of the subassembly may be between about 0.5 mm thick and about 4.0 mm thick or from about 1.0 mm to about 3 mm thick. Cleaning elements, such as tufts may be installed into the plate by any method known to those familiar in the art such as stapling, overmolding, or anchor-free tufting. In a tufted subassembly, there may be between 1 and about 100 tufts or from between about 30 to 60 tufts.

The subassembly 184 as shown in FIG. 13, 13A may comprise a plate 186 having no cleaning elements, and may contain blind holes only, or even no holes or features to attach cleaning elements. In those embodiments having blind holes, the intent would be to add cleaning elements at a later stage, such as stapling tufts of bristles in at a later step in the manufacturing process. In this manner, a stronger plastic designed for tuft retention could be used for the subassembly and a less-expensive material or material more optimal for blow molding could be used for the remainder of the toothbrush. In certain embodiments, a plate can be manufactured from an engineering thermoplastic such as polyoxymethylene (POM) and the remainder of the toothbrush from polypropylene (PP). In those embodiments where no bristles or blind holes are included in the plate during molding, the holes could be drilled at a later manufacturing step, following molding of the toothbrush. In one or more embodiments, the subassembly could be some form of decorative element, with no intention to include tufts of bristles. Examples of such decorative elements include: lenses, molded shapes, colored regions, simulated gemstones, etc. In still further embodiments, the subassembly could comprise some electronic system or subsystem. Examples of electronic systems include: digital readouts, including digital watches and clocks; timers; alarms; music-generating systems; speakers; batteries; resistors; capacitors; inductors; transistors and combinations thereof.

As shown in FIG. 2 the cavity halves are brought together once they surround a length of the parison 51 sufficient to create a toothbrush. FIG. 2 shows the cavity halves 59A, 59B closed around the parison 51 to form an extrusion blow mold cavity 61. As shown in FIGS. 2 and 2A the parison 51 has a cross-sectional area ($PA_{CA}$) which is the total area of the cross-section as defined by the outer surface 54 of the parison 51. FIG. 2B shows the extrusion blow mold cavity 61 has a cross-sectional area ($EC_{CA}$), which is the total area of the cross-section as defined by the extrusion blow mold cavity surface 60A, 60B. As shown in FIG. 2C the maximum cross-sectional area $EC_{CAM}$ of the extrusion blow mold cavity 61 is greater than the maximum cross-sectional area $PA_{CAM}$ of the parison 51. Further, as FIG. 2D shows, to form contours in the extrusion blow mold cavity 61, in certain embodiments a maximum cross-sectional area $EC_{CAM}$ is bordered along the longitudinal axis $L_{EM}$ of the extrusion blow mold 59 by cross-sectional areas $EC_{CA1}$, $EC_{CA2}$, each having a smaller area than the area of the maximum cross-sectional area $EC_{CAM}$. In certain embodiments contours may also be formed in the extrusion blow mold cavity 61 by having a minimum cross-sectional area $EC_{CAMN}$ bordered along the longitudinal axis $L_{EM}$ of the extrusion blow mold 59 by cross-sectional areas $EC_{CA3}$, $EC_{CA4}$, each having a greater area than the area of the minimum cross-sectional area $EC_{CAMN}$.

Figure 2A:
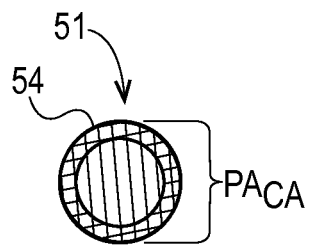
FIG. 2A is a cross-sectional view of FIG. 11 along section line 11A according to an embodiment of the present invention.
Figure 2B:
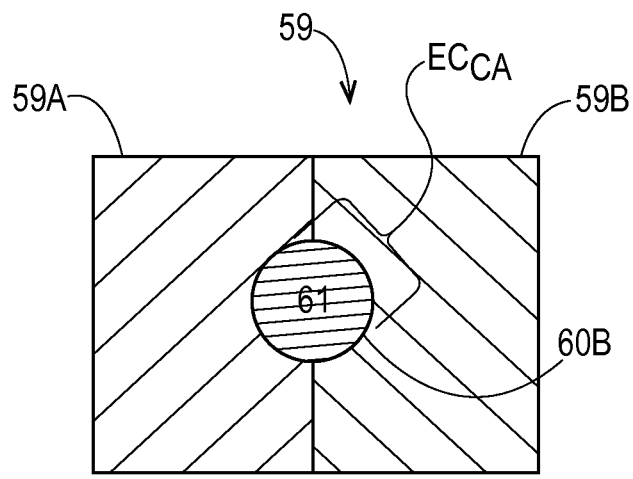
FIG. 2B is a cross-sectional view of FIG. 11 along section line 11B according to an embodiment of the present invention.
Figure 2C:
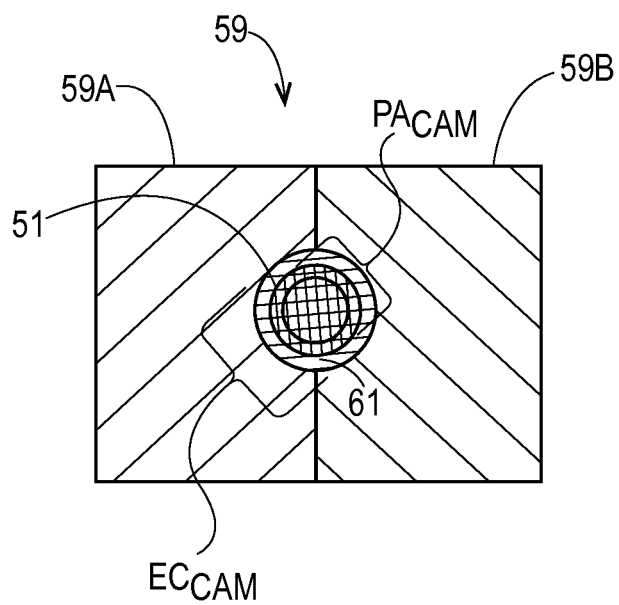
FIG. 2C is a cross-sectional view of FIG. 11 along section line 11C according to an embodiment of the present invention.
Figure 2D:
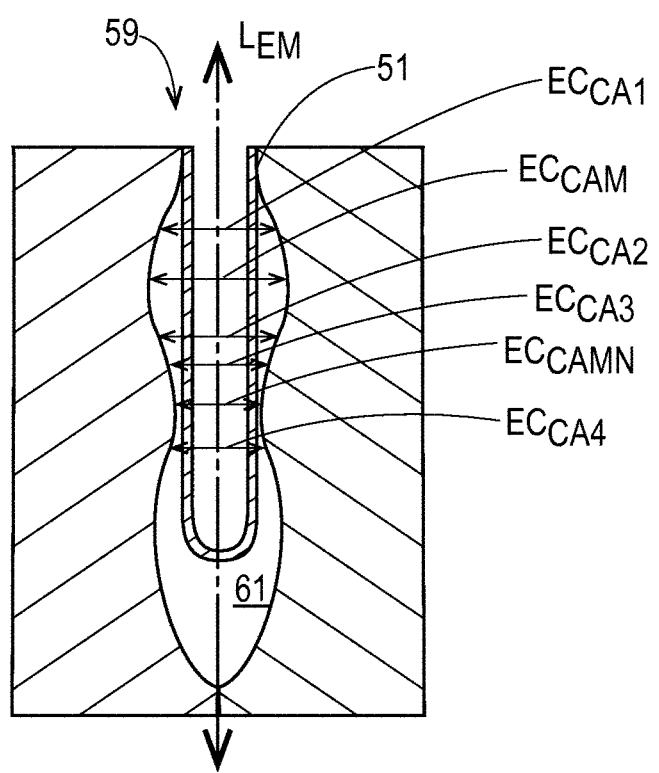
FIG. 2D is a sectional view of a blow mold process for producing a toothbrush handle according to an embodiment of the invention.
Figure 3:
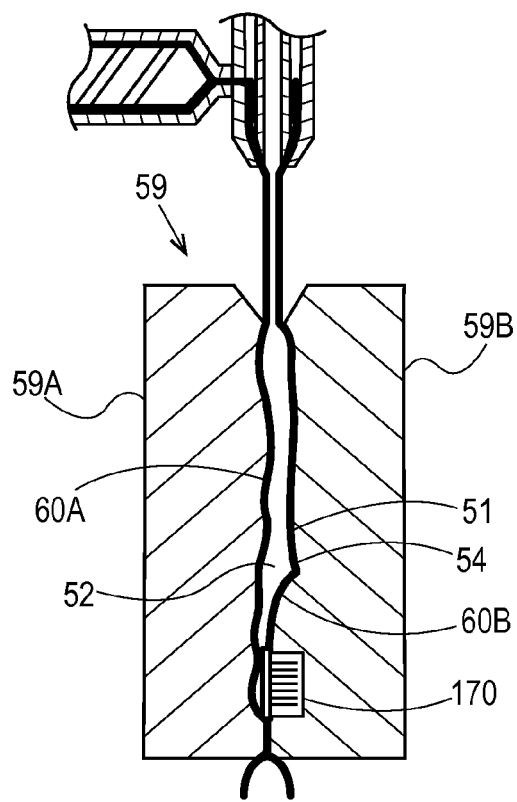
FIG. 3 is a sectional view of an extrusion blow mold process for producing a toothbrush according to an embodiment of the invention.

FIGS. 2 and 3 show that once the cavity halves 59A, 59B have closed around the parison 51, a pressure differential is produced between the interior cavity 52 and outer surface 54 of the parison 51, either by application of an above-atmospheric (positive) pressure to the parison interior cavity 52, or a below-atmospheric (negative, or vacuum) pressure to the outer surface 54 (between the parison wall and the cavity inner wall). This pressure differential causes the parison 51 to expand and increase in cross-sectional area until it contacts the cavity surface 60A, 60B, at which point the rate of cooling of that portion of the molded parison 51 increases substantially.

A portion of the parison outer surface will contact the subassembly instead of contacting the cavity wall. The parison will deform substantially about the subassembly. In certain embodiments using positive pressure, as the positive pressure is typically between about 2.8 bar and about 11 bar, which is fairly low pressure, the deformation of the parison may not substantially deform the subassembly, nor will the subassembly be damaged.

The subassembly may have on its parison-contacting surface a convex shape to prevent entrapment of air between the parison and the subassembly. The parison-contacting surface of the subassembly may be shaped such that the contact between the parison and the subassembly starts at one point and grows continually in area throughout the blowing process.

Figure 14A:
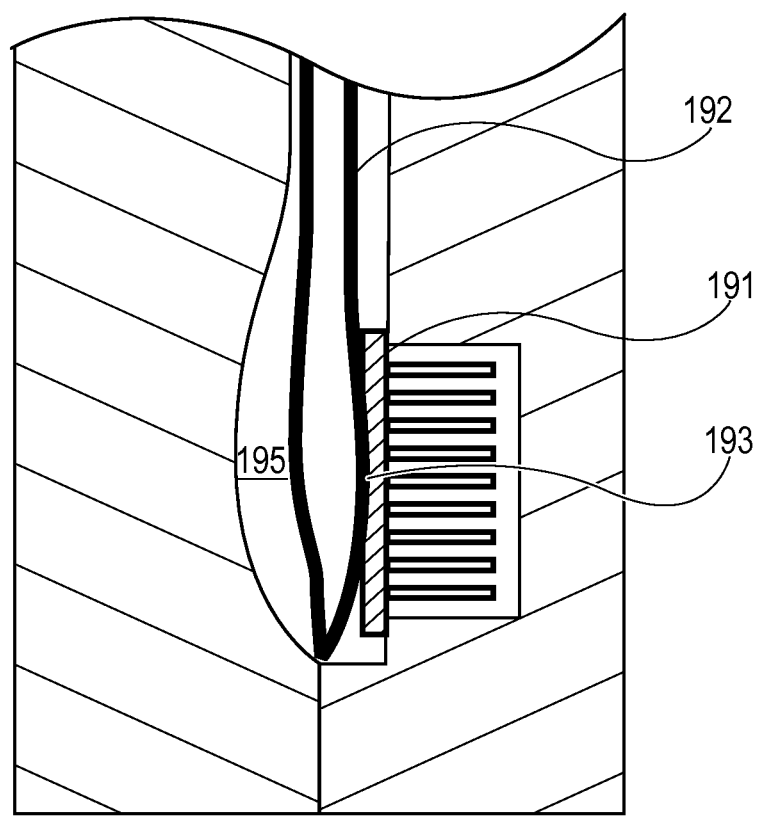
FIG. 14A-14B is a diagram of an extrusion blow molding process for producing a toothbrush according to an embodiment of the invention.
Figure 14B:
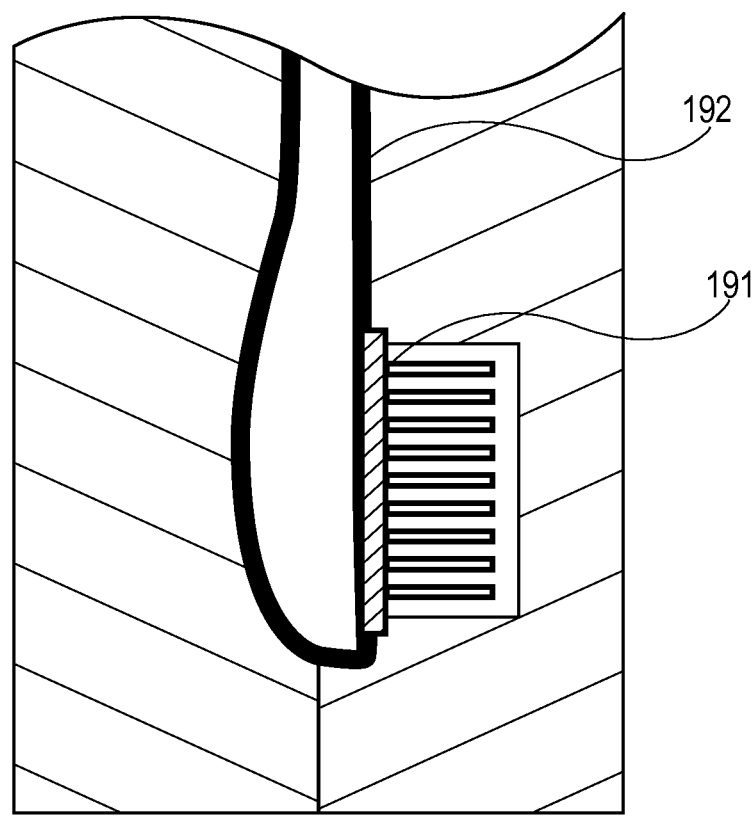

In certain embodiments, as shown in FIG. 14A, a subassembly 191 positioned in the cavity 195 prior to the blowing of the parison 192 may chemically bond to an outer surface of the parison 192 during blowing of the heated parison 192. For example, at least a portion of a surface, such as the parison-contacting surface of the subassembly, which contacts the parison might be made from polypropylene and the parison might also be made from polypropylene, so that an intrinsic binding occurs between the two when the high-temperature parison contacts the subassembly parison-contacting surface. Once fully blown, the parison 192 bonds chemically to contact surfaces between the parison and the subassembly 191 which are exposed to the parison in the cavity, as shown in FIG. 14B. To promote chemical bonding the parison temperature may be between about 120° C. to about 280° C. or from about 140° C. to about 250° C., and the subassembly can be from about 0° C. to about 150° C. when it is positioned in the cavity.

Figure 15A:
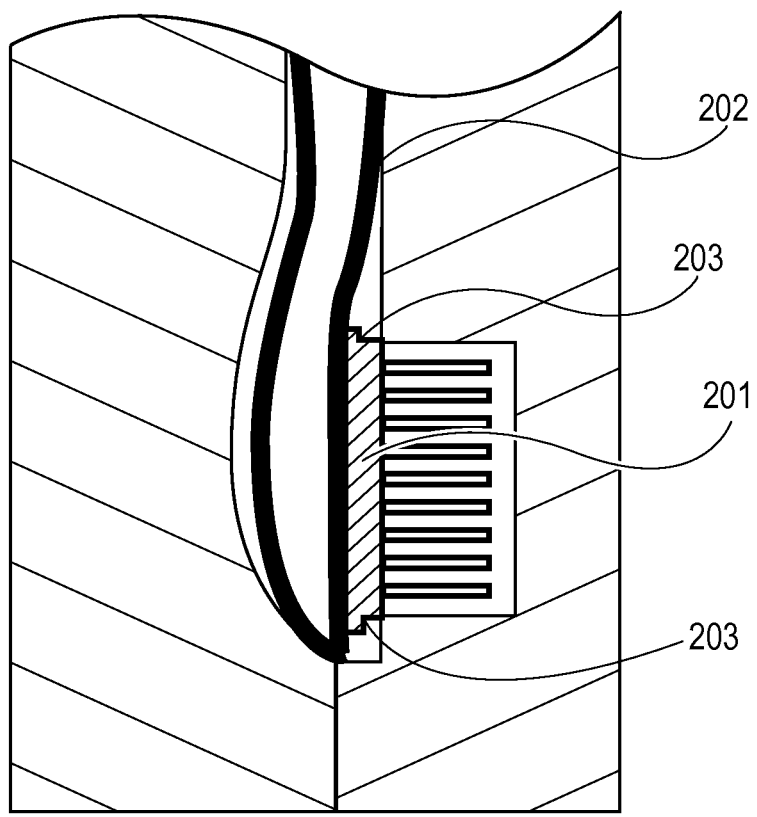
FIG. 15A-15B is a diagram of an extrusion blow molding process for producing a toothbrush according to an embodiment of the invention.
Figure 15B:
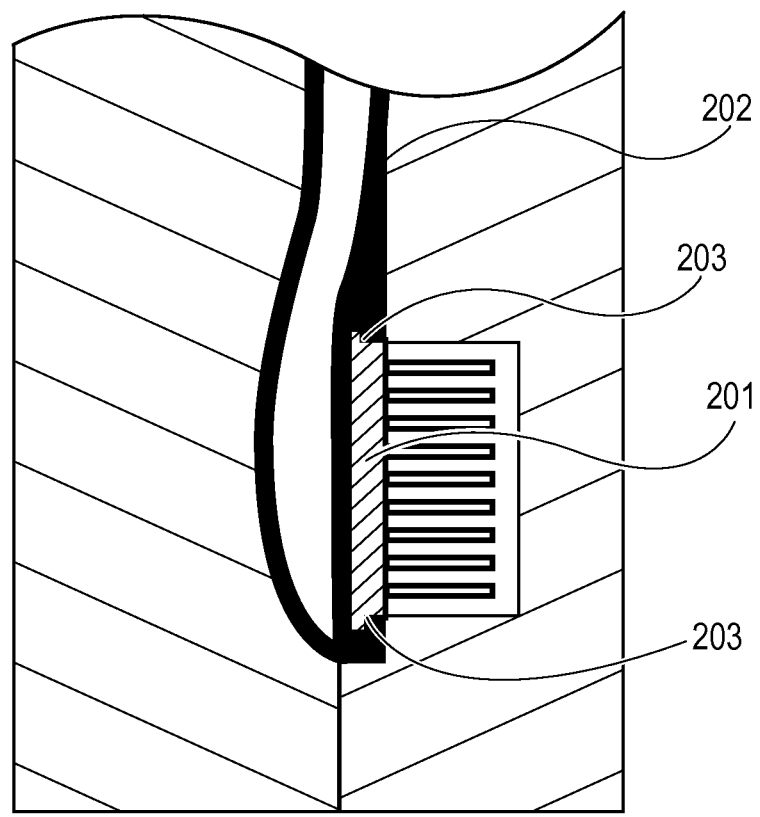

In certain embodiments the subassembly may be formed to have one or more mechanical features that the parison when expanding can form around or into to create a mechanical hold, such as for example notches, protrusions, holes, or lips. For instance, as shown in FIG. 15A, 15B the subassembly 201 is formed so that the parison 202 which will surround it after blowing (FIG. 15B) will contain undercuts 203, for example to allow for non-compatible or dissimilar materials to comprise the subassembly and the parison. In this case, a mechanical bond between the parison, or toothbrush body, and the subassembly is created without there being necessary a chemical bond between the two plastics. In this case the two plastics may be chemically similar, but they are not required to be.

Figure 16A:
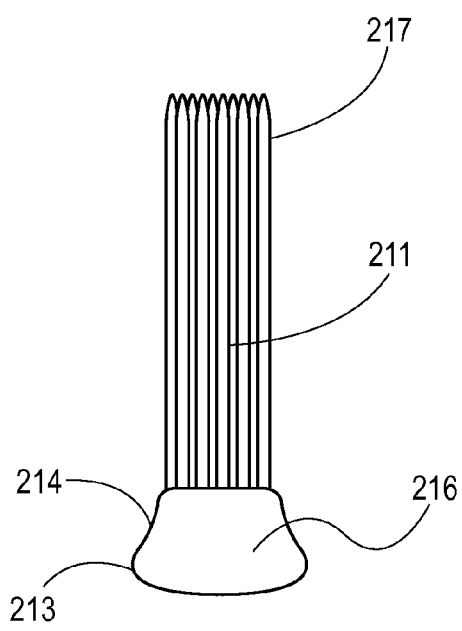
FIG. 16A-16B is a diagram of an extrusion blow molding process for producing a toothbrush according to an embodiment of the invention.
Figure 16B:
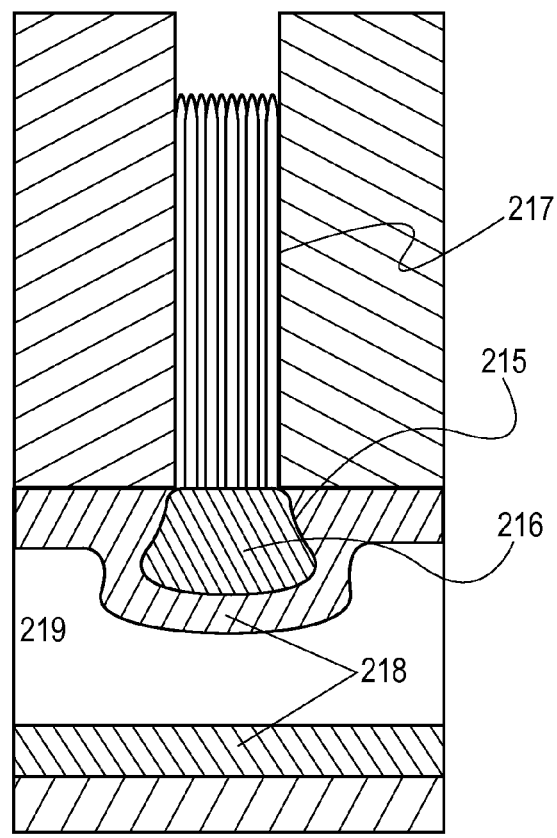
Figure 17A:
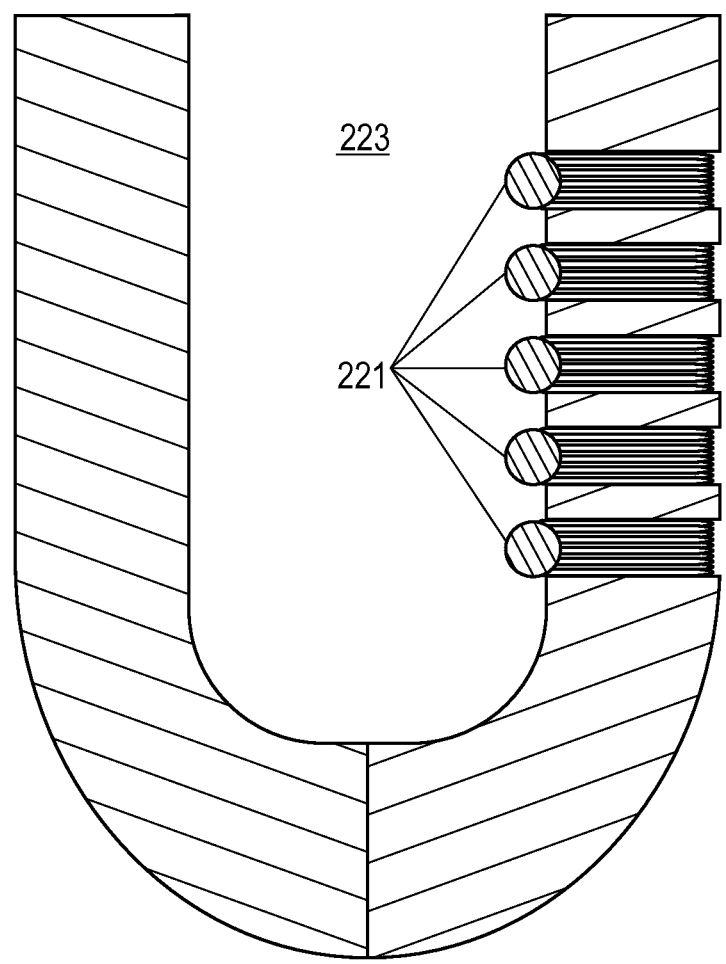
FIG. 17A-17B is a diagram of an extrusion blow molding process for producing a toothbrush according to an embodiment of the invention.
Figure 17B:
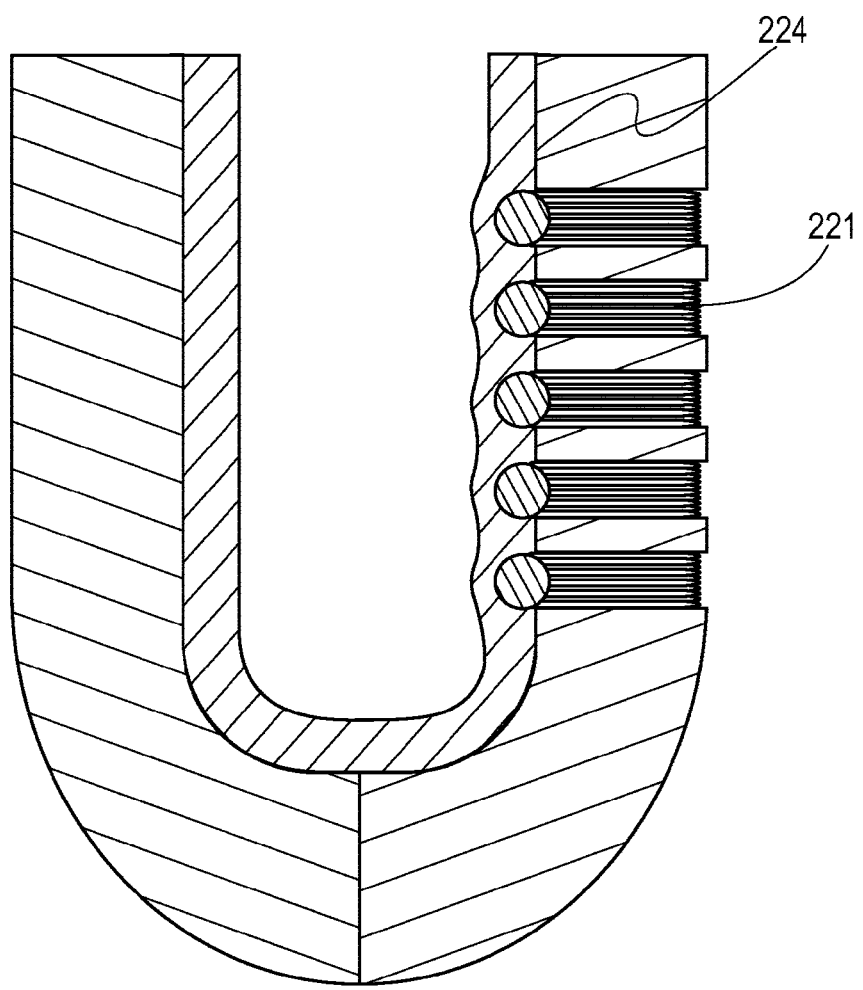

The subassembly may be a fused tuft of bristles, as shown in FIG. 16A where bristles 211 are bound together at some earlier manufacturing step and bonded or melted together in to form a tuft 217 having a fused end 216 that is shaped to create positive draft 213 and negative draft 214 along the axis of the bristles 211. In FIG. 16B a tuft 217 is positioned with the mold cavity 219, and as a parison 218 expands an undercut 215 is created around the fused end 216 of the tuft 217 by the expanding parison 218, which substantially fills the mold cavity 219. In certain embodiments, as shown in FIGS. 17A and 17B, an array or pattern of multiple subassemblies of fused tufts 221 may be positioned within the mold cavity 223 and which together with the parison 224 comprise the tufted head of a toothbrush.

Figure 18A:
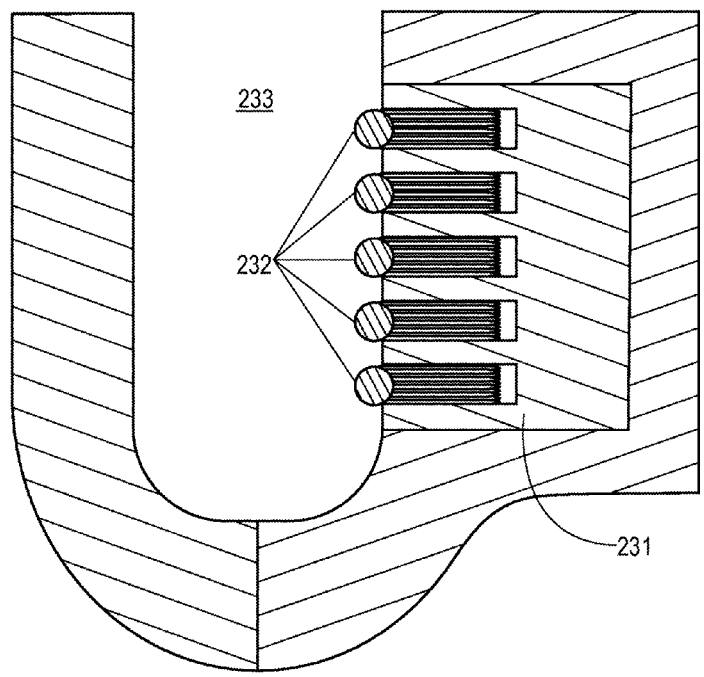
FIG. 18A-18B is a diagram of an extrusion blow molding process for producing a toothbrush according to an embodiment of the invention.
Figure 18B:
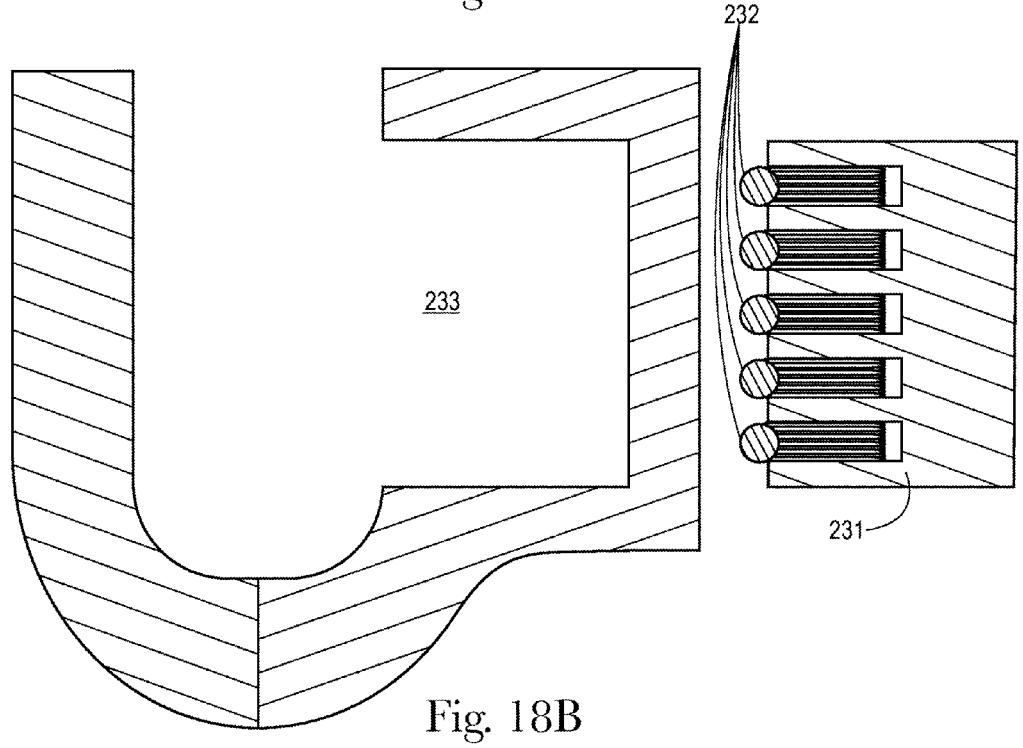

A subassembly or subassemblies may be placed into a cavity insert as shown in FIGS. 18A and 18B, the cavity insert 231 being installed to the mold cavity 233 and removed following each cycle of molding. In this embodiment, the cavity inserts 231 may also be used as carrier elements to facilitate loading of subassemblies 232 offline from the blow molding process.

In those embodiments where positive pressure is introduced to the interior of the parison, which may be in the range of from about 2.8 bar to 11.0 bar, there should be fluid communication from the interior of the parison to a high-pressure source of fluid. Wherein fluid may include air or other gases, such as nitrogen. In certain embodiments, this communication may be provided by cutting the cavity-enclosed portion of the parison off, and blowing a fluid, such as air in through the resulting hole from a pressurized source or reservoir. In certain embodiments, a needle may be used to punch a hole in the parison wall and inject high-pressure air through the hole. In still further embodiments, the air may be directed or guided through the hole in the top of the parison that is the result of cutting the portion of the parison that is held within the cavity. In this embodiment, it may also be desirable to widen this hole by blowing air prior to injection of an air nozzle within the parison, and this is known to those familiar in the art as providing support air.

In certain embodiments where negative pressure is introduced between the parison wall exterior surface and the cavity surface a partial vacuum may be created, wherein the vacuum may range from about 0.1 bar to about 1.0 bar below atmospheric or from about 0.3 bar to about 0.7 bar below atmospheric. Such a vacuum can be communicated from an external source to the cavity between the parison wall exterior surface and the cavity surface. In an embodiment, one or more small holes are made through the cavity wall to the external source to allow this communication. The relatively low viscosity of air, combined with the small volume of air to extract allows the communication hole or holes to be small enough such that material in the parison wall coming into contact with the hole or holes does not substantially deform through the hole or holes.

In certain embodiments a one or more portions of the toothbrush mold cavity have smaller cross-sectional areas than the parison cross-sectional area so that these compression portions of a toothbrush may be formed purely by compression of the mold cavity halves during closing. This compression portion of the mold may include the portion containing the subassembly, or it may not. Application of the pressure differential via fluid may help form this compression portion, may help to fully fill out the cavity, or both. The compression portion of the toothbrush may, for example, contain the geometry used to snap, screw, or otherwise attach to a separate component of the toothbrush, such as a decorative or gripping element elsewhere on the toothbrush. The compression portion of the resulting molded toothbrush may contain fold lines and possibly attached flattened material where the parison is compressed between the cavity walls outside of the compression portion of the cavity. This extra material is called flash, and is generally removed or will naturally be cut off from the rest of the molded toothbrush. The cutting or removal of flash will sometimes leave a vestige or spur on a toothbrush.

As the parison 51 cools under pressure differential, the final shape of a toothbrush is produced, which in certain embodiments as shown in FIG. 3A is a toothbrush with an integrated, tufted head installed using the in-mold assembly method described above.

Figure 4:
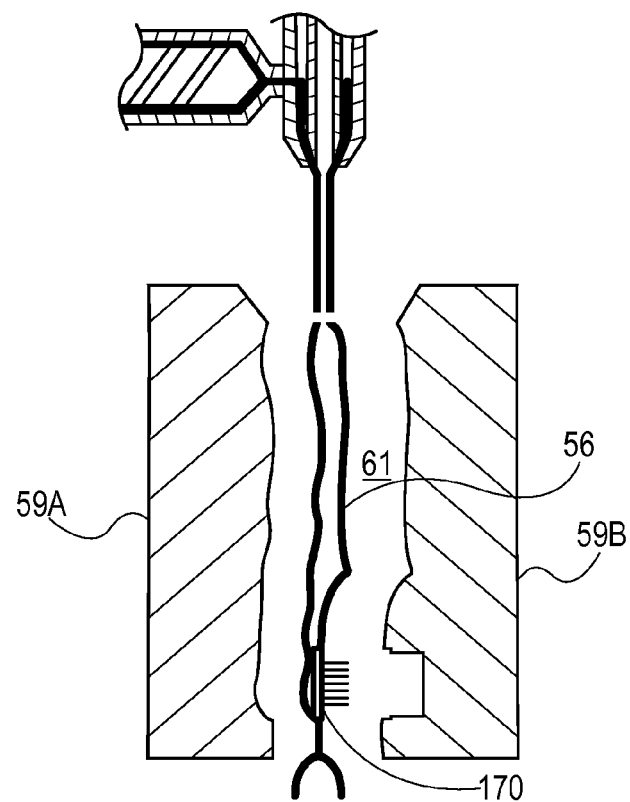
FIGS. 4-5 are sectional views an extrusion blow molding process for producing a toothbrush handle according to an embodiment of the present invention.
Figure 5:
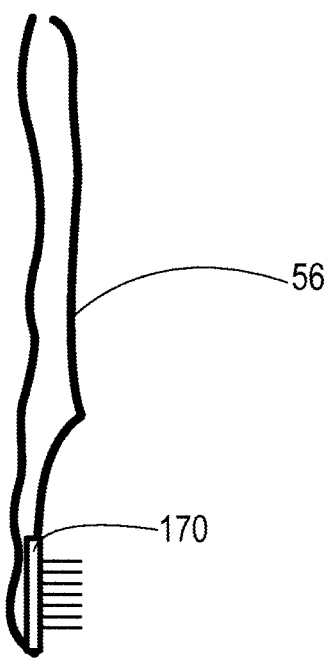

The cavity halves 59A, 59B, as shown in FIGS. 4 and 5 are opened the toothbrush 56 is separated and removed from the extrusion blow mold cavity 61.

In certain embodiments of the invention, additional layers to the hollow toothbrush can be added by the method of In-Mold Labeling (IML). IML is used to place and position labels, such as TPE labels at one or more specific locations on the surface of the toothbrush. IML is the inclusion of one or more previously-manufactured flexible but solid components that will form an intrinsic part of the toothbrush by attaching and conforming intimately to the outer surface of the blow molded part. Positioning of the IML can be used to enhance the cosmetic appearance, texture, grip, feel, friction, coefficient of friction, or softness of the toothbrush, for example by using a vacuum to secure labels in position on the inner cavity wall of the mold prior to molding or using vacuum or vent ports to provide both positioning of the label in the part and a texture to the outer tactile surface of the IML portion of the toothbrush. The thickness and durometer of the TPE are selected to allow the TPE to deform substantially, and at least partially re-melt at the contact surface with the parison, so that labeling around a compound corner can be achieved with satisfactory cosmetic results.

Labels may include decorative elements, soft-touch elements (with a durometer between Shore A of about 20 and Shore A of about 90), grip areas, textured features, self-healing elements, brand or logo placements, hard materials, tufted inserts, or multiple-purpose elements. Further, labels can be made with a tactile surface-area-to-volume ratio (TSAV ratio) that is typically greater than can be achieved with injection molding. The TSAV for a label is defined here as the ratio of surface area visible or touchable by a user to the displaced or occupied volume of the label. For example, an insert may be from about 0.1 mm to about 0.4 mm thick and have a tactile cross-sectional area greater than about 400 mm$^2$. This label would therefore have a TSAV of 10 mm$^{-1}$ to 2.5 mm$^{-1}$. For injection-molded second components, it is difficult to achieve a TSAV greater than 2.0 mm$^{-1}$, whereas for in-mold labeling TSAV>10 mm$^{-1}$ is practical. A high TSAV is a distinct advantage for materials whose primary benefit derives from surface features such as coefficient of friction, color, surface texture or other decoration.

In certain embodiments of a multi-layer toothbrush made via IML, labels thickness is thin enough to substantially deform during the blow molding step so that labels conform to the three-dimensional shape or contours of the molding cavity and retain that shape after the toothbrush is removed from the mold. In certain embodiments labels made from a TPE based material may be under 0.30 mm, 0.25 mm, 0.20 mm or 0.10 mm thick. For example labels made from a polypropylene-based TPE in the Shore A 30-50 range may be under 0.25 mm thick when the polypropylene part wall is 1-3 mm thick to ensure adequate forming to mold cavity contours having radii of curvature less than 0.5/mm.

In another embodiment of a multi-layer toothbrush made via in-mold labeling, labels have a thickness allowing them to adhere chemically via re-melt to the blown parison during blown molding, but do not deform substantially at the outer surface. In some instances of this embodiment, labels may be pre-textured in an earlier extrusion step via embossing, or in an injection molding step. In this embodiment, labels may be thicker than 0.25 mm, 0.30 mm, or 0.40 mm.

In a still further embodiment of a multi-layer toothbrush made via IML, the label thickness is thin enough, for example thicker than 0.10 mm, 0.15 mm, or 0.2 mm to substantially deform during the blow molding step so that labels conform to and retain the macro-structure or macro-texture of the mold surface, but not so thin that they retain the micro-structure of the mold surface. In this instance, macro-structure is defined to comprise texture or features on a length scale greater than 0.1 mm such as tactile ribs, bosses, dimples or bumps; and micro-structure is defined to comprise texture or features on a length scale less than 0.01 mm such as grit-blasted textures, matte textures, witness lines or parting lines. In this embodiment, labels should be thicker than 0.10 mm.

In certain embodiments of the present invention, the TPE labels are die cut. In other embodiments of the invention, the TPE labels are injection molded in a separate first step and are inserted into the blow mold cavity in a separate second step.

Labels may also be pre-decorated or pre-printed prior to installation during molding. The printing can be done on the outside surface of the label, or if the label is transparent or translucent, the printing can be done on the inner surface of the label that will be in contact with the toothbrush outer surface. In this embodiment, the printed label's inner surface can be isolated from the user, from chemicals, and water, which provides for improved durability.

In addition to vacuum-assisted In-Mold Labeling (IML), there are a number of methods by which decoration can be added to a toothbrush. For example, a shrink sleeve may be wrapped around a toothbrush or portion thereof, for instance a toothbrush handle and shrunk by application of heat, steam, or both to create a form-fitting decorative sleeve which is tightly attached to the handle. This sleeve may have one end wrapped over a shoulder to which a head or head and neck portion is attached. The sleeve may also have the other end tucked under a cap, for which the molded portion of the handle is designed. This may serve to seal one or both open edges of the shrink sleeve and protect from entry of water or other contaminants, or may just assist in decoration, design, and feel in the hand. Either end, neither end, or both ends of the sleeve may be tucked and contained under a separately attached part such as a head or a cap.

In another embodiment, decoration may be printed directly onto the surface of a toothbrush following the blow molding operation. The printing of decoration may also be performed on the parison after extrusion but before the blowing operation to take advantage of the single ruled nature of the extruded parison outer surface prior to blowing into a compound surface that would be difficult or impossible to print efficiently.

Figure 6:
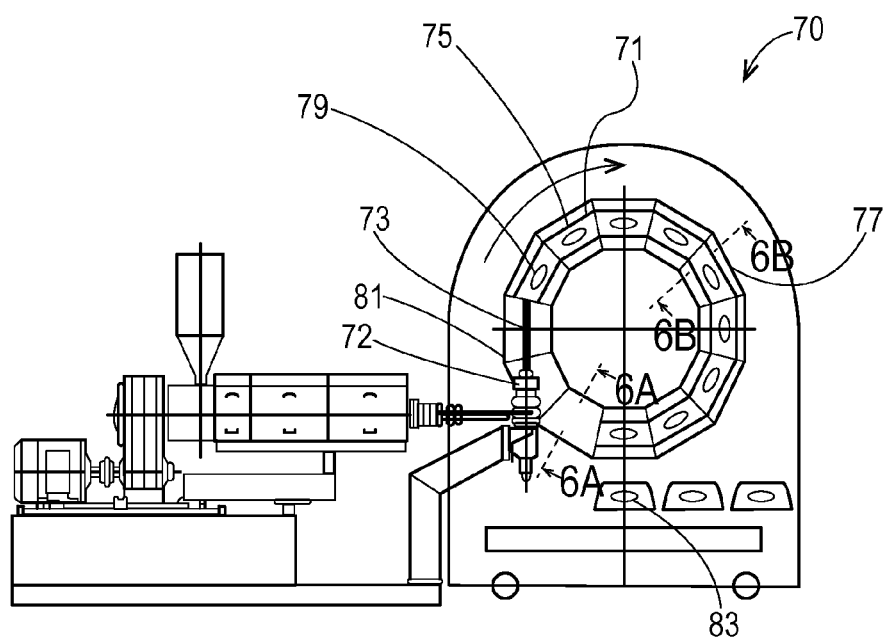
FIG. 6 is a diagram of an extrusion blow molding process for producing a toothbrush according to an embodiment of the present invention.
Figure 7:
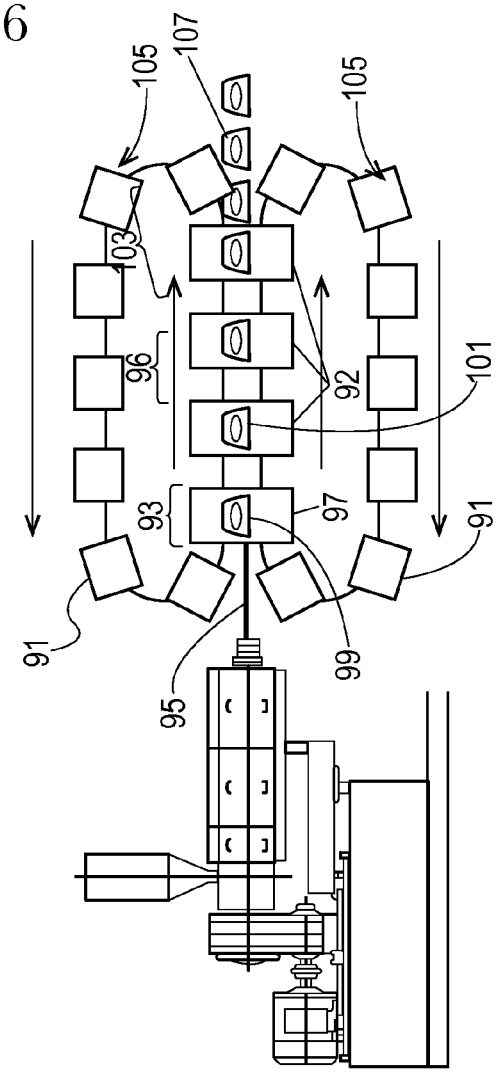
FIG. 7 is a diagram of an extrusion blow molding process for producing a toothbrush according to an embodiment of the present invention.

Extrusion blow molding molds may be arranged in at least three configurations for large-scale manufacturing: in a first configuration, molds are transported along a wheel, in a second configuration the molds are moved along on opposing tracks (caterpillar system), and in a third shuttle configuration molds open and close around extruded parisons. It should be noted that while FIGS. 6 and 7 show an extruded parison entering blow molds the same blow molding configurations may be used in an injection blow molding method, wherein a preform would enter a blow mold instead of an extruded parison. In the case of injection blow molding, the perform could be taken directly from an injection mold cavity to a blow mold cavity while still hot, or it could be taken from the injection mold cavity to storage, followed by re-heating at an intermediate step, and then subsequently into the blow mold cavity, and this is known to those familiar in the art as re-heat injection blow molding.

Figure 6B:
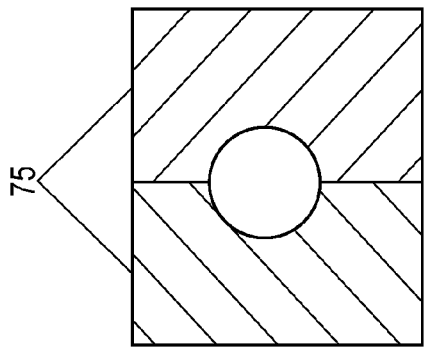
FIG. 6B is a cross-sectional view of FIG. 15 along section line 15B according to an embodiment of the present invention.
Figure 6A:
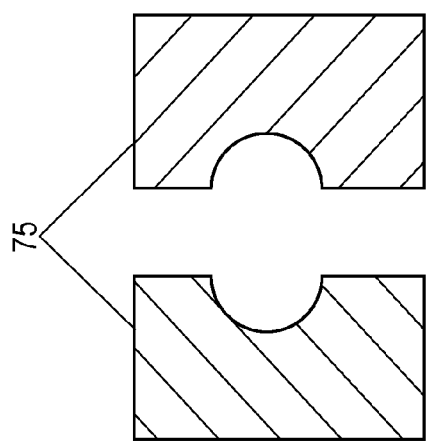
FIG. 6A is a cross-sectional view of FIG. 15 along section line 15A according to an embodiment of the present invention.

In the wheel configuration, as shown in FIG. 6, blow mold 71 cavity halves 75 are mounted in mated pairs on a wheel system 70 in such a manner that the parison 73 extrusion direction is approximately tangent to the outer edge of the wheel 77. An extruder 72 can extrude the parison 73 substantially upward against gravity, substantially downward coincident with gravity, or any direction in between. Cavity halves 75 move relative to one another substantially in one direction to open, as shown in FIG. 6A, and in the opposite direction to close, as shown in FIG. 6B—to produce a blow mold 71, in which this direction is parallel to the axis of the wheel 77 and orthogonal to the extrusion direction of the parison 73. In this manner, cavity halves 75 may close upon the parison 73 when the longitudinal direction of the blow mold cavity 79 is approximately parallel to the parison 73 extrusion direction.

In this embodiment, the parison extrusion annulus 81 is stationary, and the wheel 77 rotates to move a parison 73 sealed in a blow mold 71 out of the way to accommodate further extrusion of the parison 73 for the next cavity pair 75 to move into place. As a blow mold 71 containing a sealed parison 73 moves, the pressure differential is introduced to expand the parison wall to the cavity inner walls of the blow mold cavity 79 and the parison 73 cools. After a specified duration of time and rotation of the wheel 77, the cavity halves 75 open and the substantially formed toothbrush 83 is extracted or ejected from the cavity halves 75. In this manner, extrusion of the parison 73 is substantially continuous. Cavities in the wheel may be substantially identical to one another, or may vary in shape to allow a variety of designs to be formed from the same equipment without necessitating a line stop or changeover.

In a second embodiment, as shown in FIG. 7, cavity halves 91 are arranged on opposing tracks, 105 sometimes called caterpillar tracks, that rotate in opposite directions and allow cavity halves 91 to be held in mating contact with one another to produce a blow mold 92 where two or more blow molds 92 are transferred in sequence from a first location 93 where the parison 95 is extruded and captured by an open cavity pair 97, to a second location 96 where a pressure differential is introduced to the blow mold 92. The parison 95 is extruded between two open mated cavity halves 91 in continuous motion, which close together at a first location 93 by action of a track 105 on which they travel. Cavity halves 91 are oriented on the track 105, such that the toothbrush longitudinal direction is substantially parallel to the parison extrusion direction.

When the cavity halves 91 are fully sealed, a pressure differential is created as described above, either by positive pressure, negative pressure, or a combination of both. The parison expands until it reaches the inner walls of the blow mold cavity, at which point cooling of the parison is substantially increased. When the parison has cooled sufficiently to hold its form, the cavity halves 91 are opened by action of the track 105 on which they follow, and the formed toothbrush is ejected. Cavity halves 91 separate from one another and are returned to the first location 93 along the back half of the rotating continuous track 105.

In a shuttle cavity configuration, as shown in FIG. 8A, cavity halves 91 are mounted in mated pairs to produce a blow mold 92; where two or more blow molds 92 are transferred in sequence from a first location (A) where the parison 95 is extruded and captured by a blow mold 92, to a second location (B) where a pressure differential is introduced to the blow mold 92. At the first location (A), the blow mold 92 is held substantially motionless while the parison 95 is extruded into the blow mold 92. When the parison 95 has extruded into the blow mold 92 cavity, the blow mold moves to the second location (B). At the second location (B) a pressure differential is introduced to the blow mold 92 by positive pressure, negative pressure, or a combination of both, for example typically by positive pressure through a blowing nozzle or a blowing needle. The parison 95 expands in diameter until it reaches the cavity wall at which point cooling of the parison 95 is substantially increased. The sealed and pressurized blow mold 92 is typically held substantially motionless during the creation of the pressure differential and the cooling of the parison 95 until the parison 95 has cooled below its glass transition temperature or heat deflection temperature, to such a degree that its form has solidified. When the parison 95 has cooled sufficiently to hold its form, the cavity halves 91 are opened and the formed toothbrush is ejected, possibly at the second location (B) or in certain embodiments after moving to a third location. Cavity halves 91 separate from one another and are returned to the first position (A).

In any of the extrusion blow molding embodiments, it is possible to increase production rate, and thereby equipment efficiency, by extruding more than one parison simultaneously in a direction parallel and in close proximity to the first parison. For example, each parison may be enclosed entirely within its own cavity, but adjacent, non-mating cavity halves may be cut into the same mold. This allows for more efficient production, as a disproportionately large portion of the expense of an extrusion blow molding system may be involved in the cavity handling system, such as the wheel, shuttles, or caterpillar track. In one embodiment of multi-parison extrusion, parisons are supplied by the same extruder, but split by a manifold into multiple parisons. In a second embodiment, parisons are fed by separate extruders. This second embodiment solves the problem of simultaneous production of multiple colors of articles, such as toothbrushes, which simplifies post-production handling and installation of toothbrushes into multiple-article packages in which not all toothbrushes are desired to be the same color.

In extrusion blow molding, there is typically a higher percentage of scrap material than in injection molding or injection blow molding, due to the extra material from the parison that exists between molded articles. The closing of the blow molds pinches the parison at the top and bottom and in some cases where the final toothbrush cross-sectional area is less than the parison cross-sectional area, on the sides as well, creating flash as described above. This flash, is typically trimmed off after the forming operation is complete. To solve the problem of excess flash, it is possible to mold two toothbrushes facing one another across the plane normal to the longitudinal axis in a single cavity, trimming them apart after the forming operation is complete. In this embodiment, the pressure differential may be applied in any manner described, but may be applied as a positive pressure via a needle injection between the two toothbrushes. Parts molded in this manner may be described as 'kissing'.

Figure 8:
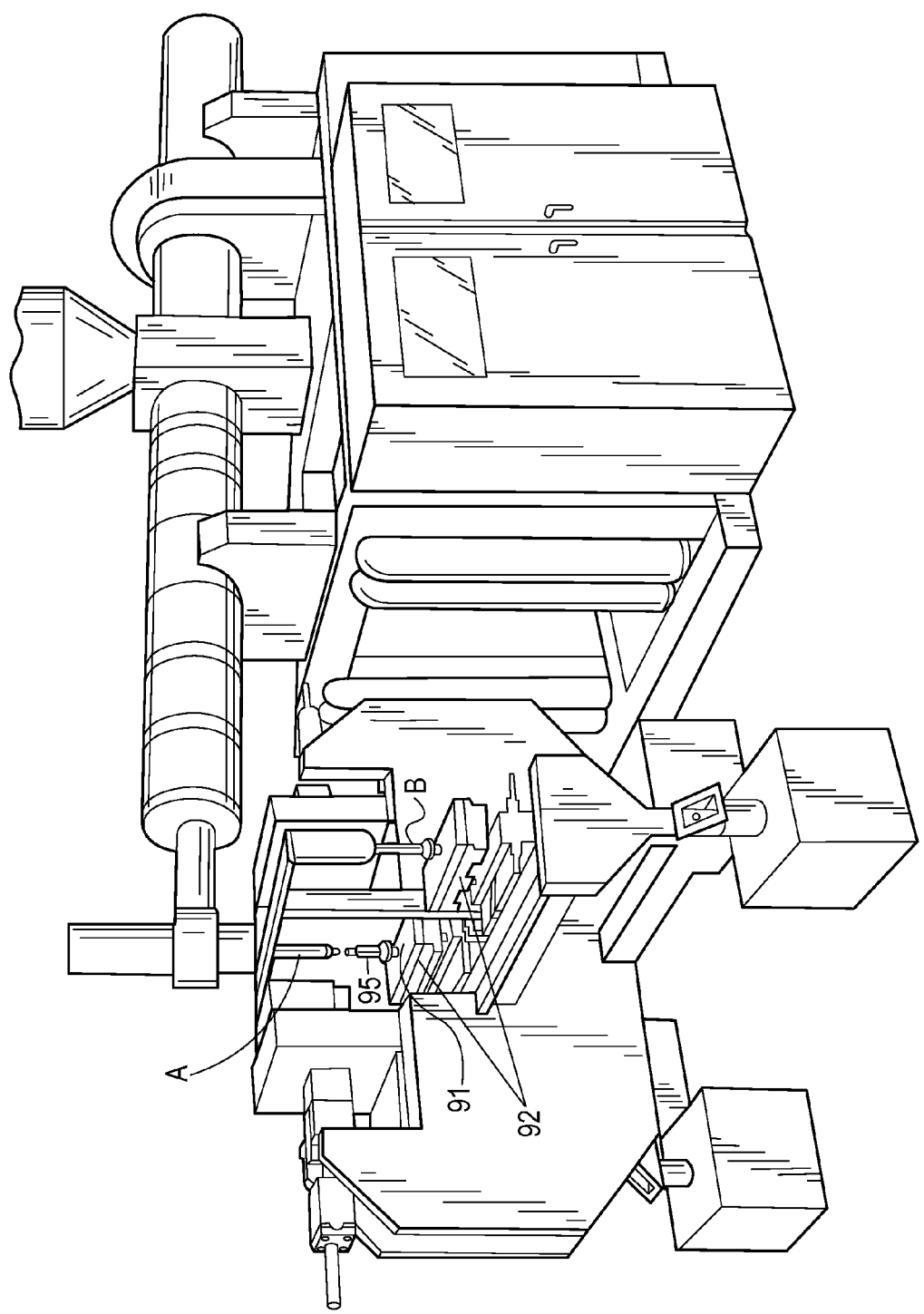
FIG. 8 is a diagram of an extrusion blow molding process for producing a toothbrush according to an embodiment of the present invention.
Figure 9:
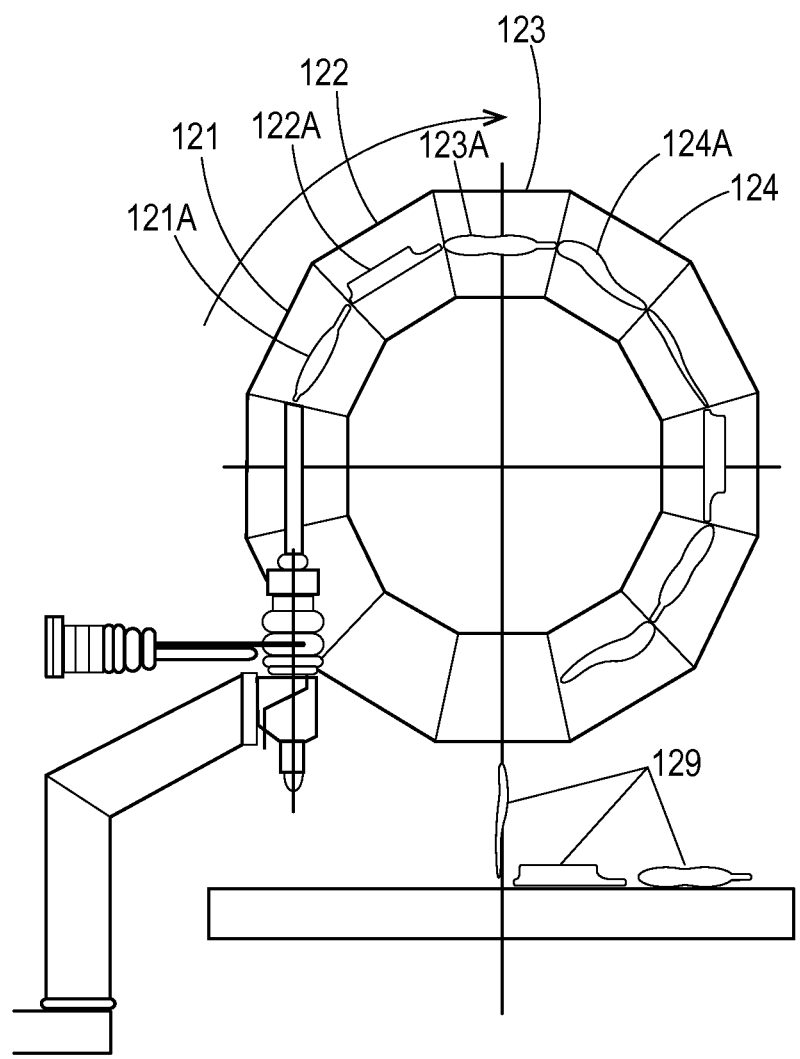
FIG. 9 is a diagram of an extrusion blow molding process for producing a toothbrush according to an embodiment of the present invention.

In addition, in any blow molding embodiment, such as that shown in FIG. 6-8, the blow mold cavities can differ from one blow mold to the next, so that a single process can produce multiple differing toothbrushes in direct sequence. For example as shown in FIG. 17 blow molds 121, 123, 125, 127 mounted in a wheel configuration have a series of different shaped cavities 121A, 122A, 123A, 124A to create toothbrushes 129 with different shapes.

Figure 10:
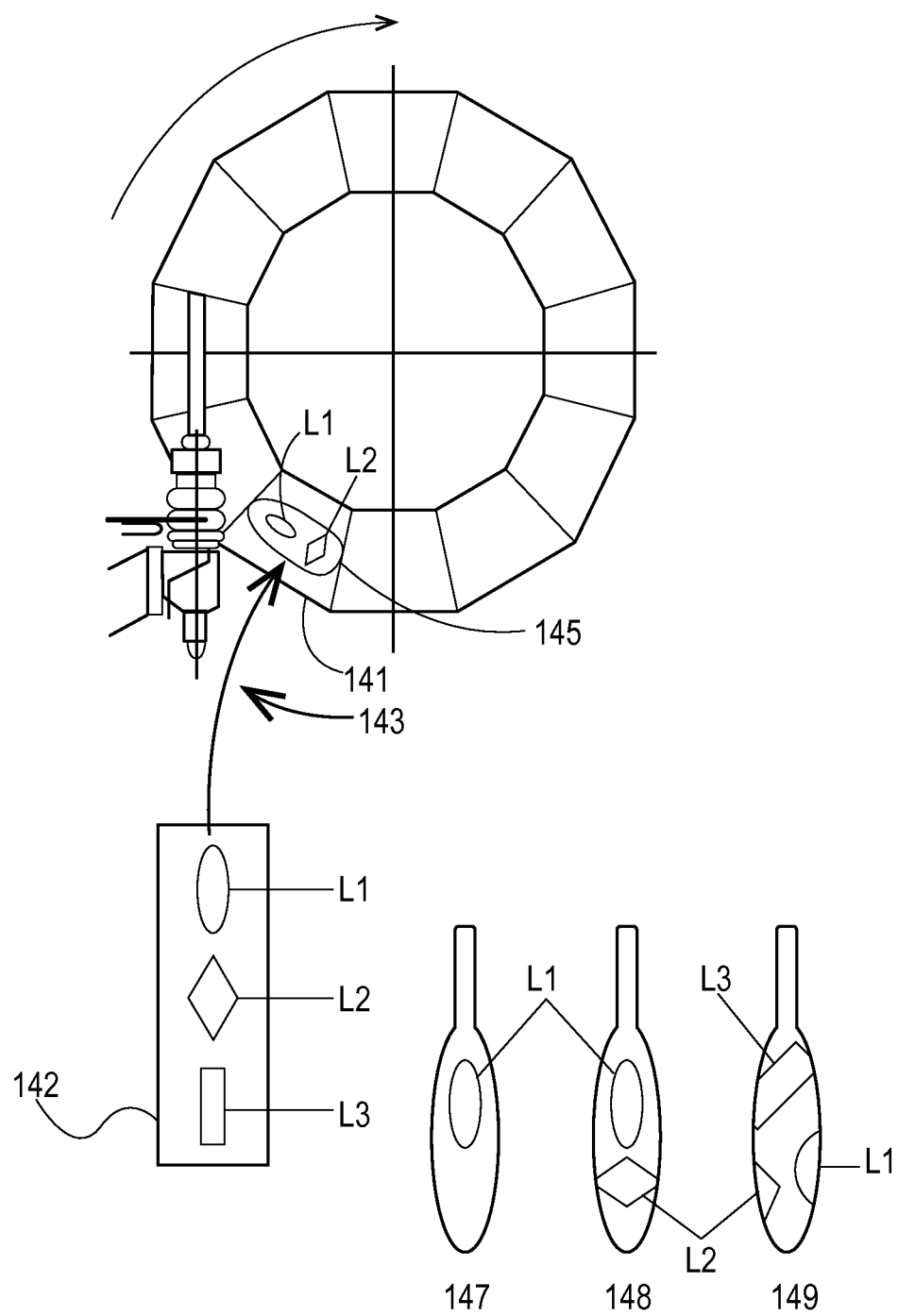
FIG. 10 is a diagram of an extrusion blow molding process for producing a toothbrush according to an embodiment of the present invention.

Further, in any blow molding embodiment, such as that shown in FIG. 6 or 7, the blow molding configuration may include a labels insert mechanism 142, such as a servo-controlled placement arm or a robot arm, as shown in FIG. 10.

In certain embodiments the insert mechanism may contain multiple labels, for example as shown in FIG. 10 the insert mechanism 18 includes multiple labels L1, L2, L3. The labels $L_1$, $L_2$ can be placed inside the open cavity halves 141 by a handling and feeding mechanism 143. One or more labels $L_1$, $L_2$ can be placed inside a cavity 145 at the same time to form toothbrushes 147, 148, 149 having different labels $L_1$, $L_2$, $L_3$. The labels can have different shapes, thickness, colors, texture, materials and print. The labels are typically held inside the tool cavity by vacuum or may be held in areas of tight curvature by friction and bending alone. In certain embodiments there are between about one to ten labels per mold or from about one to three labels per mold. In certain embodiments labels may be exposed on the outer surface of a toothbrush; or partially or completely embedded within the parison; or any combination thereof. For example a label may be completely or partially embedded in a transparent or translucent toothbrush so it can still be viewed or an label may be exposed on the toothbrush surface for viewing.

As the toothbrush leaves the manufacturing equipment the toothbrush can be post processed, decorated, assembled with other parts and packed.

Figure 11:
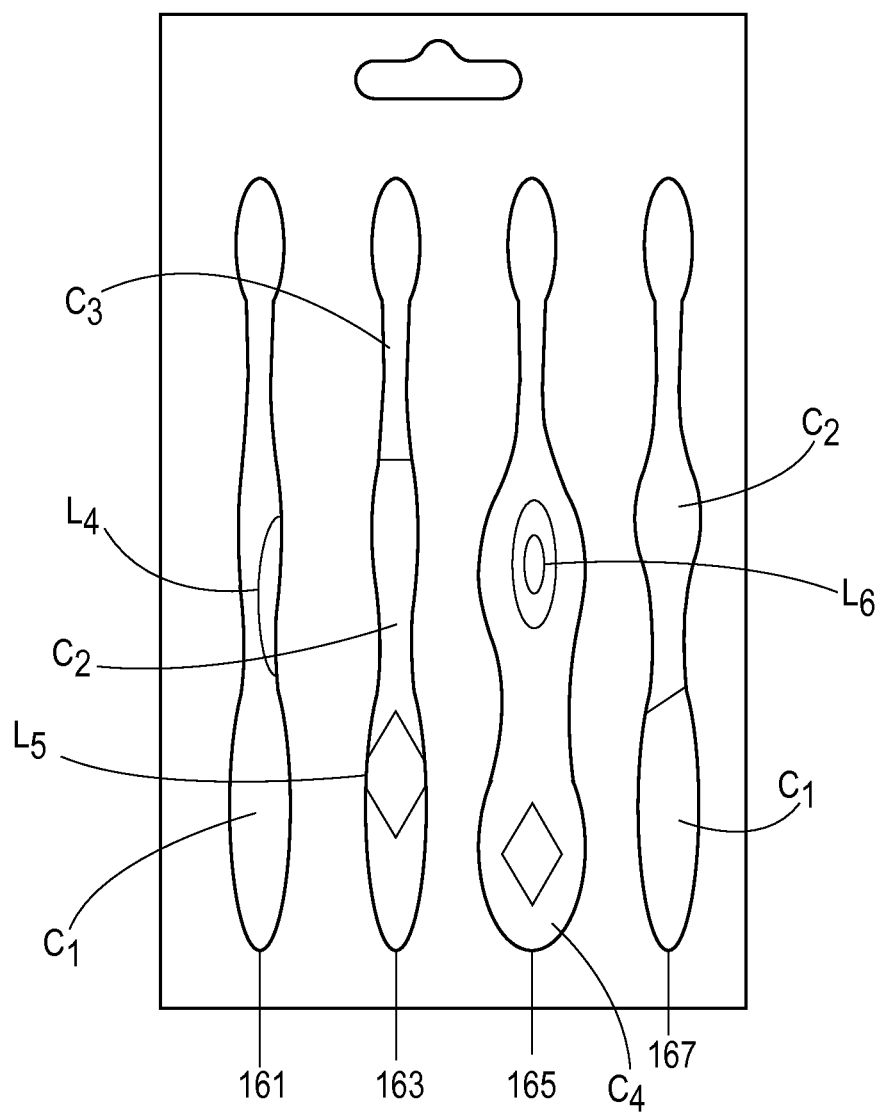
FIG. 11 is an illustration of toothbrush handles according to an embodiment of the invention.

FIG. 11 shows a package containing a variety of toothbrushes 161, 163, 165, 167 each toothbrush having an individual and differing shape, color or color combinations C1, C2, C3, C4 and labels $L_4$, $L_5$, $L_6$.

FIG. 19 shows an embodiment of a personal care article that can be produced using one or more of the methods of the present invention, in this instance a toothbrush 310 having a head 320, neck 330, handle 340, a handle end 342 and a head end 222. The toothbrush 310 may be unitarily formed as a single piece and comprise an inner cavity 360 and an outer surface 312, wherein the outer surface 312 varies in cross-sectional area ($OS_{CA}$), which is the total area of the cross-section as defined by the outer surface 312, along the toothbrush 310 longitudinal axis L—as shown in FIG. 19A; in this embodiment the handle 340 has a substantially hourglass shape. The inner cavity 360 has an inner cavity surface 362, wherein the inner cavity surface 362 varies in cross-sectional area ($IC_{CA}$) along the toothbrush longitudinal axis L. As FIG. 19 shows, in certain embodiments the inner cavity 360 of the toothbrush 310 has a greater cross-sectional area $IC_{CAG}$ bordered along the longitudinal axis L of the toothbrush 310 by cross-sectional areas $IC_{CA1}$, $IC_{CA2}$ having a smaller area than the area of the greater cross-sectional area $IC_{CAG}$, to form a contour. A toothbrush 310 inner cavity 360 may also have a lesser cross-sectional area $IC_{CAL}$ bordered along the longitudinal axis L of the toothbrush 310 by cross-sectional areas $IC_{CA3}$, $IC_{CA4}$ having a greater area than the area of the lesser cross-sectional area $IC_{CAL}$, to form a contour. In another embodiment, the cross-sectional area at the handle end of the brush is smaller than at least one or more other cross-sectional area along the longitudinal axis L of the toothbrush 310.

Further, as shown in FIGS. 19, 19A and 19B, in certain embodiments the inner cavity surface 362 varies in cross-sectional area proportionally to the variations in the of cross-section area of the outer surface 312 along the longitudinal axis L of the toothbrush 310, except at the very end of the inner cavity along the longitudinal axis L of the toothbrush 310. As shown in FIG. 19 the head 320 and at least a portion of neck 330 along the longitudinal axis L of the toothbrush 310 may be substantially solid or as shown in FIG. 20 in a toothbrush 400 the inner cavity 410 may extend from the handle 440 into the neck 430 but not passing into the head 420 of the toothbrush 400, as determined by a first tuft hole 432 closest to the handle end 442 of the toothbrush 400. In certain embodiments the inner cavity extends at least partially into the head of the toothbrush. In certain embodiments, the percentage of air void volume to the volume of the brush handle and neck ranges from about 50% to about 70% or from about 55% to about 70%; meaning the same percentage of material is saved compared to a solid toothbrush with the same or similar shape and size. FIG. 20A is a longitudinal cross-sectional view of the toothbrush 400 of FIG. 2 showing a subassembly 450 in the toothbrush head In certain embodiments, the thickness of the hollow portion wall, as determined by the distance between the outer surface of the toothbrush and the inner cavity surface, can be evenly distributed and as thin as about 0.9 to about 1.1 mm. In certain embodiments the average wall thickness of the hollow portion of the toothbrush is about 1.0 mm and the standard deviation of the thickness is about 0.25 mm, which is only about 25.3% of the average thickness. In certain embodiments, the wall thickness of the hollow portion ranges from about 1.0 to about 3.5 mm. In certain embodiments the average wall thickness of the hollow portion is about 1.80 mm and the standard deviation of the wall thickness is about 0.44 mm, which is only about 23.4% of the average thickness. In certain embodiments the average wall thickness of the hollow portion of the toothbrush may be from about 1.0 mm to about 2.5 mm, where the toothbrush is strong enough to have the rigidity needed for usage and still saves enough material.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for extrusion blow molding a toothbrush comprising:
    a) providing an extrusion blow mold having a longitudinal axis and a cavity, the cavity having a handle portion, a neck portion, a head portion, and a surface that defines a cross-sectional area; wherein the cavity has at least one of a maximum cross-sectional area, bordered by two smaller cross-sectional areas along the longitudinal axis of the blow mold or a minimum cross sectional area bordered by two greater cross-sectional areas along the longitudinal axis of the blow mold;
    b) providing a subassembly positioned in the head portion of the cavity;
    c) extruding a parison comprising a thermoplastic material, the parison includes an interior cavity and an outer surface, wherein the outer surface defines a cross-sectional area of the parison;
    d) expanding the parison using a fluid to contact the cavity surface and subassembly to produce a toothbrush handle having an inner cavity.

2. The method of claim 1, wherein the subassembly comprises a front surface and a parison contacting surface.

3. The method of claim 2, wherein the parison contacting surface of the subassembly has a convex shape.

4. The method of claim 1, wherein the subassembly comprises at least one cleaning element extending from the front surface.

5. The method of claim 4, wherein the at least one cleaning element extends into a recess positioned in the head portion of the cavity.

6. The method of claim 1, wherein the parison and subassembly comprise the same thermoplastic material.

7. The method of claim 1, wherein the subassembly comprises a mechanical feature.

8. The method of claim 1, wherein the minimum cross-sectional area of the extrusion blow mold cavity is less than the cross-sectional area of the parison.

9. The method of claim 1, wherein the maximum cross-sectional area of the extrusion blow mold cavity is greater than the cross-sectional area of the parison.

10. The method of claim 1, wherein the extrusion blow mold includes a label prior to extrusion of the parison.

11. A toothbrush produced by the method of claim 1 comprising:
    a) a head, neck, handle, handle end, head end, outer surface, inner cavity, and longitudinal axis;
    b) the inner cavity having a surface defining a cross-sectional area; wherein the inner cavity has at least one of a greater cross-sectional area, bordered by two lesser cross-sectional areas along the longitudinal axis of the toothbrush or a lesser cross sectional area bordered by two greater cross-sectional areas along the longitudinal axis of the toothbrush;
    c) the outer surface defining an outer surface cross-sectional area;
    d) a wall formed from the outer cavity surface and inner cavity surface;
    e) a subassembly positioned in the head;
wherein the toothbrush comprising a single unitary component.

12. The toothbrush of claim 11, wherein the square root of the outer surface cross-sectional area varies proportionally to the square root of the inner cavity cross-sectional area along the longitudinal axis of the toothbrush.

13. The toothbrush of claim 12, wherein the square root of the inner cavity surface cross-sectional area varies proportionally less than 5% to the variations in the square root of the outer surface cross-sectional area along the longitudinal axis of the toothbrush handle.

14. The toothbrush of claim 11, wherein the in the thickness of the toothbrush handle wall varies in inverse proportion to the square root of the outer surface cross-sectional area.

15. The toothbrush of claim 11 having a specific gravity below about 0.60 g/cm$^3$ and wherein the toothbrush handle deforms less than about 20 mm under a 5.0N force applied as determined by ASTM D 790.

16. A method for extrusion blow molding a toothbrush comprising:
    a) providing an extrusion blow mold having a longitudinal axis and a cavity, the cavity having a handle portion, a neck portion, a head portion, and a surface that defines a cross-sectional area; wherein the cavity has at least one of a maximum cross-sectional area, bordered by two smaller cross-sectional areas along the longitudinal axis of the blow mold or a minimum cross sectional area bordered by two greater cross-sectional areas along the longitudinal axis of the blow mold;
    b) providing a subassembly positioned in the head portion of the cavity;
    c) extruding a parison comprising a first thermoplastic material and a second thermoplastic material, the parison includes an interior cavity and an outer surface, wherein the outer surface defines a cross-sectional area of the parison;
    d) expanding the parison using a fluid to contact the cavity surface and subassembly to produce a toothbrush handle having an inner cavity.

17. The method of claim 16, wherein the first material forms an inner layer and the second thermoplastic material forms an outer layer.

18. The method of claim 16, wherein the first thermoplastic material and the second thermoplastic material form a single layer.

19. A toothbrush produced by the method of claim 16 comprising:
    a) a head, neck, handle, handle end, head end, outer surface, inner cavity, and longitudinal axis;
    b) the inner cavity having a surface defining a cross-sectional area; wherein the inner cavity has at least one of a greater cross-sectional area, bordered by two lesser cross-sectional areas along the longitudinal axis of the toothbrush or a lesser cross sectional area bordered by two greater cross-sectional areas along the longitudinal axis of the toothbrush;
    c) the outer surface defining an outer surface cross-sectional area;
    d) a wall formed from the outer cavity surface and inner cavity surface;
    e) a subassembly positioned in the head;
wherein the toothbrush comprising a single unitary component.

20. The toothbrush of claim 19, wherein the square root of the outer surface cross-sectional area varies proportionally to the square root of the inner cavity cross-sectional area along the longitudinal axis of the toothbrush.

* * * * *